United States Patent
Duboc, Jr. et al.

(10) Patent No.: US 7,071,907 B1
(45) Date of Patent: Jul. 4, 2006

(54) DISPLAY WITH ACTIVE CONTRAST ENHANCEMENT

(75) Inventors: Robert M. Duboc, Jr., Menlo Park, CA (US); Christopher J. Curtin, San Jose, CA (US); William A. Crossland, Harlow (GB); Anthony B. Davey, Bishop Stortford (GB); Theodore S. Fahlen, San Jose, CA (US)

(73) Assignees: Candescent Technologies Corporation, San Mateo, CA (US); Candescent Intellectual Property Services, Inc., Los Gatos, CA (US)

( * ) Notice: Subject to any disclaimer, the term of this patent is extended or adjusted under 35 U.S.C. 154(b) by 0 days.

(21) Appl. No.: 09/307,044

(22) Filed: May 7, 1999

(51) Int. Cl.
G09G 3/36 (2006.01)

(52) U.S. Cl. ......................... 345/87; 345/204

(58) Field of Classification Search ................ 349/25, 349/27, 29, 30, 149, 24; 345/204, 207, 104, 345/102, 84; 313/422, 495, 463; 348/805
See application file for complete search history.

(56) References Cited

U.S. PATENT DOCUMENTS

| 4,231,068 A | * | 10/1980 | Hunt | 313/463 |
| 4,398,805 A | | 8/1983 | Cole | 350/345 |
| 4,596,446 A | * | 6/1986 | Waters et al. | 349/175 |
| 5,175,637 A | | 12/1992 | Jones et al. | 359/48 |
| 5,237,314 A | * | 8/1993 | Knapp | 345/84 |
| 5,477,105 A | * | 12/1995 | Curtin et al. | 313/422 |
| 5,483,263 A | * | 1/1996 | Bird et al. | 345/207 |
| 5,576,596 A | * | 11/1996 | Curtin et al. | 313/422 |
| 5,589,731 A | | 12/1996 | Fahlen et al. | 313/495 |
| 5,686,790 A | | 11/1997 | Curtin et al. | 313/493 |
| 5,861,929 A | * | 1/1999 | Spitzer | 349/149 |
| 5,898,266 A | | 4/1999 | Spindt et al. | 313/495 |
| 6,031,328 A | * | 2/2000 | Nakamoto | 313/495 |
| 6,055,028 A | | 4/2000 | Nishi et al. | 349/33 |
| 6,094,252 A | | 7/2000 | Itoh et al. | 349/180 |
| 6,268,843 B1 | * | 7/2001 | Arakawa | 345/102 |

FOREIGN PATENT DOCUMENTS

| EP | 0 488 455 A2 | 11/1991 |
| JP | 3-71111 | 3/1991 |
| JP | 9-133930 | 5/1997 |

(Continued)

OTHER PUBLICATIONS

Bahadur, *Liquid Crystals, Applications and Uses* (World Scientific Pub. Co. Pte. Ltd.), vol. 1, 1992, pp. 195-230, 275-303, and 361-395.

(Continued)

*Primary Examiner*—Chanh Nguyen
(74) *Attorney, Agent, or Firm*—Ronald J. Meetin

(57) ABSTRACT

A display (50) with enhanced image contrast contains an image-producing component (60) and a set of shutter strips (80). The image-producing component, typically a flat-panel device, has multiple imaging lines that provide light to produce an image. Each shutter strip is situated in front of one or more associated imaging lines. By appropriately switching the shutter strips between light-absorptive and light-transmissive states, the image contrast is enhanced. The shutter strips are typically implemented with a liquid-crystal display structure. The switching of the shutter strips is typically performed with a control component (52/76) which utilizes light to control the shutter switching and which is synchronized to signals (90 or/and 100) that control the imaging lines.

65 Claims, 12 Drawing Sheets

FOREIGN PATENT DOCUMENTS

| JP | 9-281526 | 10/1997 |
|---|---|---|
| JP | 10-148829 | 6/1998 |
| WO | WO 99/36935 | 7/1999 |

OTHER PUBLICATIONS

Bahadur, *Liquid Crystals, Applications and Uses* (World Scientific Pub. Co. Pte. Ltd.), vol. 3, 1992, pp. 65-208.

Curtin et al, "Fundamentals of Emissive Displays," Short Course S-3, Soc. for Info. Display, May 11, 1997, pp. 1-80.

Huang et al, "Dynamic Drive for Distable Reflective Cholesteric Displays: A Rapid Addressing Scheme," *SID Int'l Symp., Dig. Tech. Paps.*, 1995, pp. 347-350.

Huang et al, "High-Performance Dynamic Drive Scheme for Bistable Reflective Cholesteric Displays," *SID Int'l Symp., Dig. Tech. Paps.*, 1996, pp. 359-362.

Huang et al, "Unipolar Implementation for the Dynamic Drive Scheme of Bistable Reflective Cholesteric Displays," *SID Int'l Symp., Dig. Tech. Paps.*, 1997, pp. 899-902.

Koehler/Beran et al, "A Unique Active Contrast-Enhancement Filter Using Liquid-Crystal Pi-Cell Technology," *SID Int'Symp., Dig. Tech. Paps.* or *SID 86 Digest*, 1986, pp. 436-438.

O'Mara, *Liquid Crystal Flat Panel Displays* (Van Nostrand Reinhold), 1993, pp. iii-xv and 1-223.

Podojil, "Plastic VGA Reflective Cholesteric LCDs with Dynamic Drive," *SID Int'l Symp., Dig. Tech. Paps.*, 1998, pp. 51-59.

Sprokel, *The Physics and Chemistry of Liquid Crystal Devices* (Plenum Press), Sheffer et al, "Guest-Host Displays", 1979, pp 173-198.

Tani, "Storage-Type Liquid Crystal Matrix Display," *SID Int'l Symp., Dig. Tec. Paps.*, 1979, pp. 114 and 115.

Tannas, *Flat-panel Displays and CRTs* (Van Nostrand Reinhold), 1985, pp. 332-414.

Yang "Switching Mechanism of Bistable Reflective Cholesteric Displays," *SID Int'l Symp., Dig. Tech. Paps.*, 1995, pp. 351-354.

\* cited by examiner

DISPLAY WITH ACTIVE CONTRAST ENHANCEMENT

FIELD OF USE

This invention relates to displays that produce time-variable images and, more particularly, to flat-panel displays such as those of the flat cathode-ray tube ("CRT") type.

BACKGROUND

A flat-panel display is an image-producing device whose average lateral dimension along the display's viewing surface is considerably greater than the display's maximum thickness. A flat-panel display has an active image-producing portion having front and back surfaces which normally extend roughly parallel to each other and which are roughly flat. Examples of flat-panel displays are flat CRT displays, flat liquid-crystal displays ("LCDs"), flat electroluminescent displays, flat plasma displays, and flat light-emitting diode displays.

FIG. 1 schematically illustrates the active image-producing portion of a conventional flat-panel CRT display. The display contains backplate structure 20 and faceplate structure 22 connected together to form sealed enclosure 24. Backplate structure 20 contains multiple electron-emissive regions 26. Faceplate structure 22 contains multiple light-emissive elements 28 situated on transparent faceplate 30 respectively across from electron-emissive regions 26. Electrons emitted by regions 26 cause elements 28 to emit light that produces an image in an active display area at the exterior surface of faceplate 30.

The electrons emitted by each region 26 are intended to strike a corresponding target light-emissive element 28. However, some of the electrons emitted by each region 26 invariably strike the display outside target element 28. To prevent many of the off-target electrons from striking other elements 28 and causing them to emit light that degrades the image, elements 28 are laterally surrounded by a border region 32 which is substantially non-emissive of light when struck by these electrons.

Border region 32 normally contains black material which absorbs a large fraction of the ambient (external) light that impinges on region 32 from outside the display. As a result, "black matrix" 32 enhances the contrast between (a) the image light provided by light-emissive elements 28 and (b) the ambient light which strikes elements 28 and black matrix 32 in the display's active area. Unfortunately elements 28 typically reflect a substantial fraction of the ambient light that strikes them. As a result, the enhanced image contrast produced by black matrix 32 is still sometimes insufficient to achieve desired image clarity, particularly when the ambient light is of high magnitude.

Referring to FIG. 2, Hunt, U.S. Pat. No. 4,231,068, and Koehler/Beran et al, "A Unique Active Contrast-Enhancement Filter Using Liquid-Crystal Pi-Cell Technology," SID 86 Digest, 1986, pages 436–438, discuss techniques for enhancing the contrast of an image produced by raster scanning in a conventional deflected-beam CRT display 40. The techniques of Hunt and Koehler/Beran et al entail placing multiple strips 42 of an LCD in front of display 40. Signals from a control box 44 are provided on electrical lines 46 to switch each of strips 42 between a light-transmissive state and a light-absorptive state. The switching is controlled so that each strip 42 (a) transmits light when writing occurs behind that strip 42 and (b) absorbs light when no writing occurs behind that strip 42. The image contrast is enhanced, especially in high ambient lighting conditions.

The contrast-enhancement techniques disclosed in Hunt and Koehler/Beran et al are creative. However, the LCD employed in Hunt to form strips 40 contains slow-switching twisted-nematic liquid crystal. It is doubtful that the switching speed obtainable with Hunt's display would be great enough for many future applications. Furthermore, the LCDs employed in Hunt and Koehler/Beran et al utilize polarizers which significantly reduce image intensity. The polarizers may be damaged by heat and/or humidity, and thus raise reliability concerns. Also, Hunt and Koehler/Beran et al are directed to raster-scanned CRT displays of the deflected-beam type. It is desirable to have a simple, reliable, fast-switching mechanism for enhancing the contrast in a display, especially a flat-panel display such as a CRT flat-panel display.

GENERAL DISCLOSURE OF THE INVENTION

The present invention provides a display that employs such a mechanism in generating a time-variable image. The display of the invention contains an image-producing component and a set of shutter strips. The image-producing component has a multiplicity of imaging lines for producing an image. Each imaging line is regularly updated to provide light that produces part of the image.

Each shutter strip in the present display is associated with one or more of the imaging lines and is situated in front of each so-associated imaging line outside the image-producing component. During operation of the display, each shutter strip switches between a light-transmissive state and a light-absorptive state. Each shutter strip is in its light-transmissive state at least partly while each imaging line associated with that strip is providing light for the image.

By appropriately switching the shutter strips between their light-transmissive and light-absorptive states, the image contrast is actively enhanced in the present display. In particular, the fraction of ambient light reflected from a portion of the display having a shutter strip in its absorptive state is reduced compared to what would occur if the shutter strip were absent. Hence, the overall fraction of ambient light reflected from the display's viewing area is reduced. The contrast enhancement is especially helpful in high ambient lighting conditions where the high magnitude of the ambient light might otherwise degrade the image.

The image-producing component in the present display is configured as a flat-panel device in one aspect of the invention. Consequently, the overall display is a flat-panel display. In this aspect of the invention, the image-producing component is typically a generally flat CRT display. Alternatively, the image-producing component can be an LCD, a plasma display, an electroluminescent display, a light-emitting diode display, or largely any other display in which phosphor in the imaging lines selectively emits light to produce the display's image. The invention thereby provides a flat-panel display, including a flat-panel CRT display, with enhanced image contrast.

In another aspect of the invention, the updating of the imaging lines is performed by selectively activating each imaging line for a portion of the frame duration, where the frame duration is the period of time between consecutive updates of each imaging line. During the period that an imaging line is activated, largely all of the image portion produced by that line is displayed simultaneously. This type of image-line updating is referred to here as full-line-at-a-time activation or simply line-at-a-time activation. When the activation period for an imaging line ends, the imaging line rapidly ceases to provide its updated image portion. In line-at-a-time activation, an imaging line thus produces its updated image portion for only a part, typically a small part, of the frame duration. Each shutter strip is in its light-transmissive state for largely the entire period that each associated imaging line is activated to provide light for the image.

Full-line-at-a-time activation arises in matrix-addressed displays and differs from raster scanning in which dots of an imaging line are created sequentially by scanning an electron beam across the location of the line. The present invention is therefore applicable to matrix-addressed displays, especially matrix-addressed flat-panel displays.

The updating of the imaging lines is, in a third aspect of the invention, performed according to a technique referred to here as line-at-a-time updating for frame duration. In this technique, each imaging line produces its updated image portion for largely the entire frame duration. Consequently, each shutter strip is in its light-transmissive state for only part of the period in which each associated imaging line provides light to produce that line's image portion. Should smear, as seen by the human eye, occur in the image because each imaging line provides light for largely the entire frame duration, the shutter strips are employed to alleviate the smear and thereby improve the image.

In a fourth aspect of the invention, the shutter strips switch between their light-transmissive and light-absorptive states largely in response to a multiplicity of selection signals which control updating of the imaging lines or/and largely in response to at least one signal utilized in generating the line selection signals. Each imaging line is typically updated in response to a corresponding one of the selection signals going to a selection condition. Only part, typically only one, of the selection signals are simultaneously at their selection conditions at any time during normal display operation.

Each shutter strip is in its transmissive state at least largely while the selection signal for each imaging line associated with that strip is at that selection signal's selection condition. By controlling the shutter strips with the same signals used to control the imaging lines or/and with the signal(s) utilized in generating the line selection signals, synchronization difficulties between the imaging lines and the shutter strips are at a very low level. The present display operates in a simple, highly reliable manner.

In a fifth aspect of the invention, the present display contains a control component that utilizes light in causing the shutter strips to be selectively placed in their transmissive and absorptive states. The control component normally contains a group of control elements for selectively providing light that determines placement of the shutter strips in their transmissive and absorptive states. Although the light provided by each control element can originate outside the control elements, the light provided by each control element is typically light emitted by that control element. For example, when the imaging lines contain light-emissive elements as occurs in a CRT display, the control elements can be additional light-emissive elements.

The shutter strips form part of a liquid-crystal structure in a sixth aspect of the invention. The liquid-crystal structure preferably contains liquid-crystal material, such as guest/host liquid crystal, capable of being controlled to selectively transmit an image defined by unpolarized light incident on the liquid crystal. This type of liquid crystal can, under suitable conditions, be switched very fast, thereby overcoming the slow switching speed that typically arises with the twisted-nematic LCD in Hunt. Also, the present liquid-crystal structure does not need polarizers and thus avoids the image intensity loss caused by the polarizers in Hunt and Koehler/Beran et al.

The host material in the guest/host case is typically cholesteric liquid crystal. The guest material is pleochroic dye, such as black dichroic dye, having selectively presentable largely black and largely transparent appearance conditions. Molecules of the pleochroic dye align generally to molecules of the cholesteric liquid crystal. The guest/host liquid crystal material in each shutter strip has a cholesteric twist in excess of 90°, normally at least 180°, preferably at least 360°, when that strip is in its light-absorptive state. The pleochroic dye causes a shutter strip in its absorptive state to appear largely black.

The host liquid-crystal material in the cholesteristic guest/host case normally has a small pitch. The cholesteric pitch is normally no more than 5 μm, preferably no more than 3 μm. Use of small pitch at a suitable dye concentration enables the shutter strips to adequately absorb incident unpolarized visible light and to be switched very fast. When a shutter strip goes into its light-transmissive state, the molecules of the guest/host liquid crystal re-align so as to eliminate the twist and allow light to pass through the liquid-crystal material in the strip.

Each shutter strip in the liquid-crystal structure of the present display is typically formed with one of a set of first electrical conductors, an oppositely located portion of a second electrical conductor, and liquid-crystal material situated between the first conductor and the portion of the second conductor. The liquid-crystal structure then normally further includes a third electrical conductor and a group of switches connected to the third conductor. Each switch is connected to a corresponding one of the first conductors and is operable to electrically couple the corresponding first conductor to, or electrically decouple the corresponding first conductor from, the third conductor when sufficient light from an associated one of the control elements strikes that switch. Each switch normally contains light-sensitive material that switches between electrically insulating and electrically conductive conditions in response to light. This arrangement enables the shutter strips to be selectively switched between their transmissive and absorptive states.

In short, the present display, typically of the flat-panel type, provides active contrast enhancement suitable to make the display's image clear under conditions of high ambient light. The shutter strips can be switched rapidly between light-transmissive and light-absorptive states precisely when they need to be switched. The mechanism used to enhance the image contrast in the display is simple and highly reliable. Heat and humidity are of considerably less reliability concern than in the displays of Hunt and Koehler/Beran et al. The present display can be fabricated at low cost. Accordingly, the invention provides a large advance over the prior art.

Figure 1:
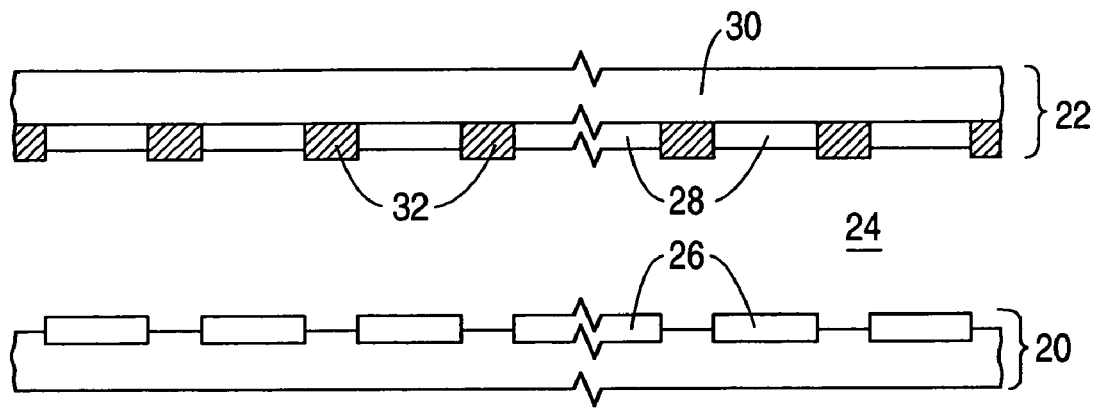
FIG. 1 is a schematic cross-sectional view of a portion of a conventional flat-panel CRT display.
Figure 2:
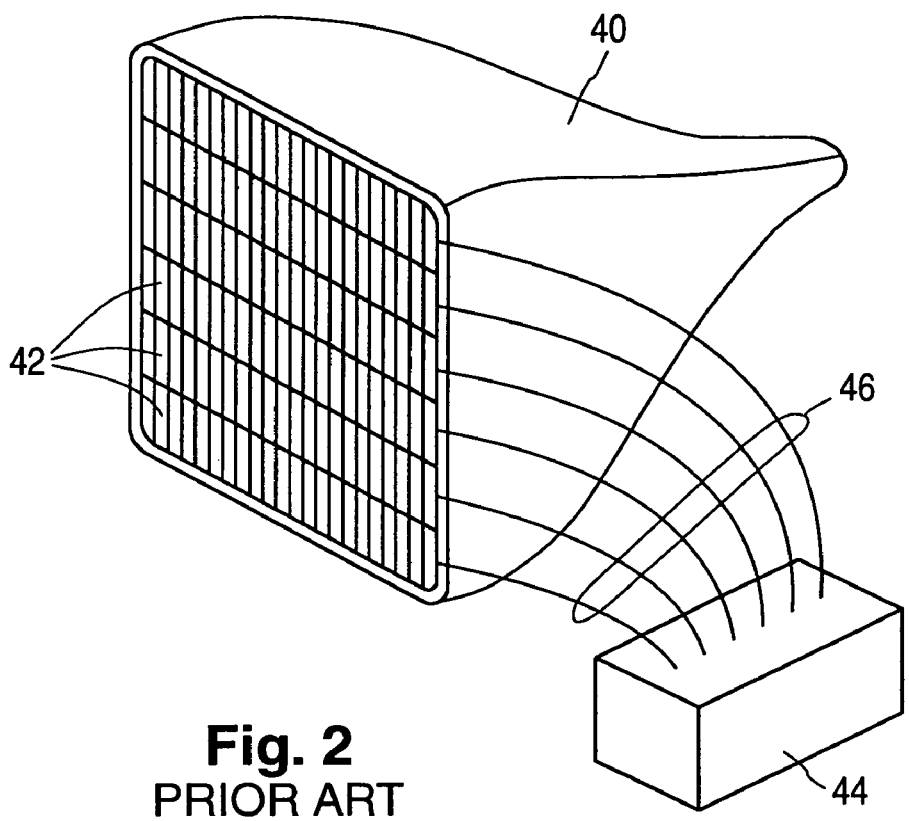
FIG. 2 is a perspective view of a conventional raster-scanned deflected-beam CRT display that employs LCD strips for enhancing image contrast.

Like reference symbols are employed in the drawings and in the description of the preferred embodiments to represent the same, or very similar, item or items. A slash ("/") across a line in the drawings indicates that the line represents multiple lines or carries multiple signals. A back slash ("\") across a line in the drawings indicates that the line may represent multiple lines or carry multiple signals, i.e., the line represents one or more lines or carries one or more signals.

DESCRIPTION OF THE PREFERRED EMBODIMENTS

General

Image contrast is actively enhanced in a display, normally a flat-panel display, configured according to the invention. The present flat-panel display is suitable for use as a flat-panel television or a flat-panel video monitor for a personal computer, a lap-top computer, or a workstation. The light which produces the display's image is then visible light. Alternatively, the present display can be tailored to applications in which the image is produced by light, e.g., infrared light, which lies outside the visible spectrum.

In the following description, the term "electrically insulating" (or "dielectric") generally applies to materials having an electrical resistivity greater than $10^{10}$ ohm-cm at 25° C. The term "electrically non-insulating" thus refers to materials having an electrical resistivity of up to $10^{10}$ ohm-cm at 25° C. Electrically non-insulating materials are divided into (a) electrically conductive materials for which the electrical resistivity is less than 1 ohm-cm at 25° C. and (b) electrically resistive materials for which the electrical resistivity is in the range of 1 ohm-cm to $10^{10}$ ohm-cm at 25° C. These categories are determined at an electric field of no more than 10 volts/µm.

The image produced by a flat-panel display normally varies with time in response to one or more external imaging signals, including one or more external image-control signals. The image appears in a viewing area at the exterior surface of a faceplate (or frontplate) of the display. In some cases, the faceplate may include one or more color filters. The exterior surface of the faceplate is normally largely flat (planar) but may be slightly curved.

Taking note of the fact that a flat-panel display is an image-producing structure whose average lateral dimension is considerably greater than the structure's maximum thickness, the average lateral dimension of a flat-panel display is determined along a centerpoint plane extending generally parallel to the center of the exterior surface of the faceplate. Quantitatively, the display's average lateral dimension is the diameter of a circle whose area is the same as the maximum lateral area projected by the display on the aforementioned centerpoint plane. This area includes both the projected viewing area and the projected area peripheral to the viewing area. The maximum thickness of a flat-panel display is the maximum distance from the faceplate's exterior surface to the back of the display, including any back-surface electronic circuitry, in a direction locally perpendicular to the faceplate's exterior surface.

The ratio of the average lateral dimension of a flat-panel display to its maximum thickness is here termed the display's overall aspect ratio. The overall aspect ratio of a flat-panel display is normally at least 4. The display's overall aspect ratio is preferably at least 10, more preferably at least 20. In this regard, the overall aspect ratio of a flat-panel display differs from its width-to-height active-area aspect ratio which is typically 4:3 or 16:9.

Light reflection consists of specular reflection and scattering. Specular reflection refers to light which leaves one object and reflects off another object in such a way as to present an image of the second object. The second object thus has a mirror-like characteristic. Scattering refers to light which leaves one object and reflects off another object in such a manner as to not present a reasonable image of the second object. Scattered light is typically reflected at a variety of angles, e.g., randomly, off the second object.

Flat-Panel Display with Light Shutter for Enhancing Contrast

Figure 3:
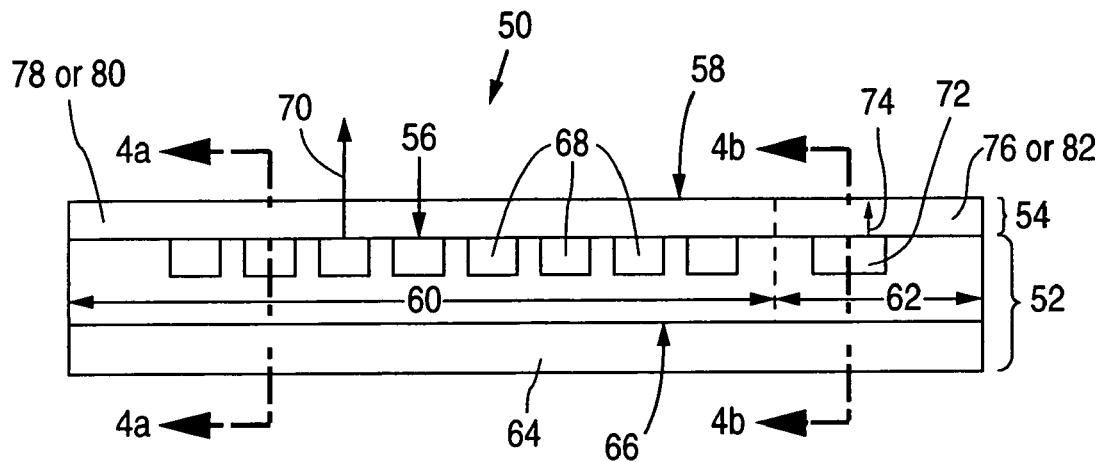
FIG. 3 is a schematic cross-sectional front view of a flat-panel display provided with a light shutter according to the invention for enhancing image contrast.
Figure 4A:
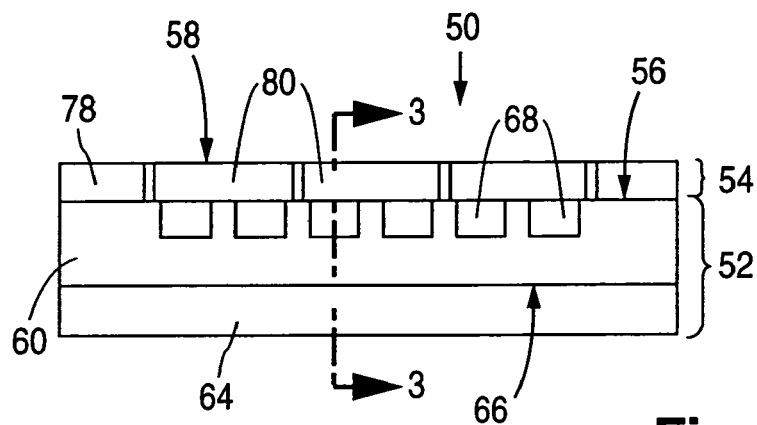
FIGS. 4a and 4b are cross-sectional side views of an example of the flat-panel display of FIG. 3. The cross sections of FIGS. 4a and 4b are respectively taken through planes 4a—4a and 4b—4b in FIG. 3. The cross section of FIG. 3 is taken through plane 3—3 in each of FIGS. 4a and 4b.
Figure 4B:
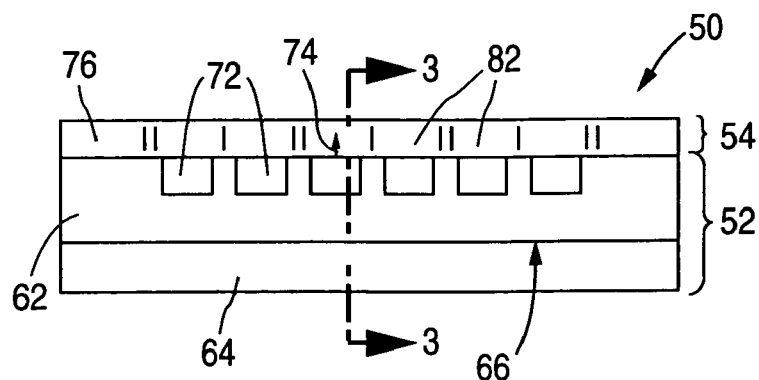

FIG. 3 schematically presents a front cross section of a flat-panel display 50 provided with a mechanism for actively enhancing image contrast according to the principles of the invention. FIGS. 4a and 4b schematically present exemplary side cross sections of flat-panel display 50. A corresponding exemplary split perspective view of display 50 is schematically presented in FIG. 5. Display 50 consists of an image-producing flat-panel device 52 and an adjoining multi-strip light shutter 54. The lower split of FIG. 5 perspectively depicts image-producing device 52. The upper split of FIG. 5 perspectively depicts light shutter 54.

Image-producing flat-panel device 52 has a front surface 56 on which a time-variable image is presented during display operation. Light shutter 54 overlies front surface 56, thereby making surface 56 an interior surface of flat-panel display 50. Shutter 54 enhances the contrast of the image presented on interior surface 56. The enhanced-contrast image is seen through, and effectively presented on, an exterior front surface 58 of shutter 54 at the front of the display. Exterior front surface 58, like interior surface 56, is typically largely flat but may be slightly curved.

Image-producing device 52 consists of an image-producing flat-panel component 60, a light-providing shutter control section 62, and electronic circuitry 64. Image-producing component 60 and shutter control section 62 are situated side by side and have a composite back surface 66. In a typical implementation, component 60 and shutter control section 62 are parts of a single sealed device.

Electronic circuitry 64 is situated largely over back surface 66. Although not indicated in FIGS. 3, 4a, 4b, and 5, portions of circuitry 64 normally extend to the sides of image-producing component 60 and shutter control section 62. Circuitry 64 typically includes a printed circuit board and attached electronic components such as one or more integrated circuits.

Image-producing component 60 contains a plurality of at least four laterally separated light-providing imaging elements 68 that produce the time-variable image on interior surface 56. Electrical lines that provide signals for operating light-providing imaging elements 68 are not shown in any of FIGS. 3, 4a, 4b, and 5. The regions denoted by reference symbols 68 in those figures solely represent the regions from which light is actually provided. Imaging elements 68 typically occupy approximately equal lateral areas.

Imaging elements 68 are configured in a multiplicity of largely parallel imaging lines. Each imaging line contains a plurality of imaging elements 68. An imaging line having three or more elements 68 is typically relatively straight. FIG. 3 depicts one line of imaging elements 68. Although each imaging line in FIG. 3 is, for simplicity, illustrated as having eight elements 68, each line normally contains considerably more than eight, e.g., 100 to 1,000 or more, of elements 68. In certain cases, each line may have less than eight elements 68.

As discussed further below, the imaging lines are periodically updated in response to a group of line selection signals. The updating procedure typically entails selectively activating the imaging lines according to the line-at-a-time activation technique. When an imaging line is activated, it produces a line of the image on interior surface 56. Selected ones of imaging elements 68 in each activated line provide light that reaches surface 56 to create the image line. Arrow 70 in FIGS. 3 and 5 indicates light provided by one of elements 68.

When two or more of imaging elements 68 in an activated imaging line are selected to provide light, all of the activated imaging elements 68 in that line provide their light largely simultaneously in the line-at-a-time activation technique. Hence, an activated imaging line provides a full line of the image largely simultaneously on interior surface 56. The line-at-a-time activation technique is normally achieved by implementing image-producing component 60 as a matrix-addressed device. Electronic circuitry 64 generates the line selection signals which provide the matrix addressing.

The imaging lines are normally activated one at a time in the line-at-a-time activation technique. That is, aside from transitions between activated and non-activated states, only a selected one of the lines is activated at any time. The remaining lines are in non-activated states. Nonetheless, two or more, but not all, of the imaging lines can be activated simultaneously.

When an imaging line leaves its activation state in the line-at-a-time activation technique, the line rapidly ceases to provide a line of the image on interior surface 56. Some image persistence may occur on surface 56 at a location corresponding to that line for a short period after the line has become deactivated. In any event, each imaging line normally produces its line of the image for only a small portion of the frame duration. For M imaging lines, the duration of each line of the image is approximately one Mth the frame duration plus any image persistence time.

The updating of the imaging lines can be performed according to a technique in which the duration of each line of the image is considerably greater than what occurs in the line-at-a-time activation technique. For instance, line-at-a-time updating for frame duration can be employed. Each imaging line then presents it updated image portion for largely the entire frame duration. In other words, the updated portion of the image is continually produced from the time that the imaging line is updated largely until the line is updated again. The updating is typically done one full line at a time in line-at-a-time updating for frame duration. Image-producing component 60 normally has a memory capability for storing the data of each imaging line for a period sufficient to enable each line of the image to be present for largely the frame duration.

The imaging lines are typically arranged so that imaging elements 68 are in a fully rectangular array of rows and columns. This arrangement is presented in the example of FIG. 5. The rows of elements 68 extend horizontally in FIG. 5. Each row of elements 68 is an imaging line and contains the same number of elements 68 as each other imaging line.

Figure 5:
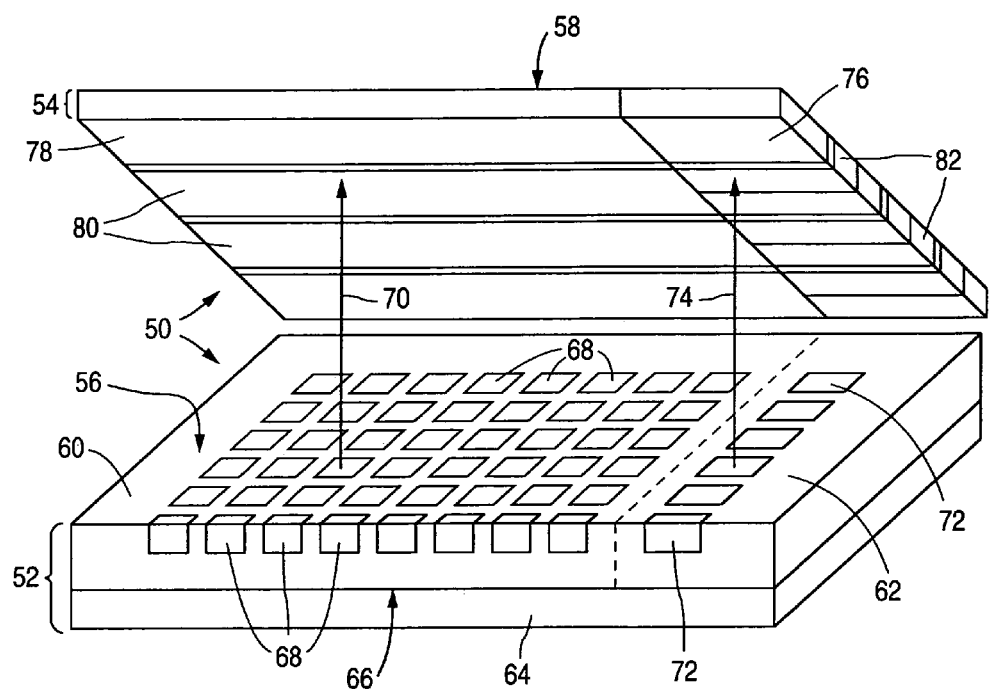
FIG. 5 is a schematic split perspective view of the flat-panel display in FIGS. 4a and 4b and thus an example of the flat-panel display in FIG. 3.

The columns of imaging elements 68 extend perpendicularly to the rows of elements 68 in the example of FIG. 5. Each column of elements 68 contains the same number of elements 68 as each other imaging column. FIG. 4a depicts elements 68 that form one imaging column in the rectangular array of FIG. 5. Although each imaging column may contain less than the six elements 68 illustrated in FIG. 4a, each imaging column normally contains considerably more than six elements 68.

Flat-panel display 50 may be a monochrome (e.g. black-and-white) or color display. In the monochrome case, each imaging element 68 forms a picture element (pixel) of image-producing device 52. For a color display, each consecutive group of three consecutive elements 68 in an imaging row typically forms a color pixel. Alternatively, each consecutive group of three consecutive elements 68 in an imaging column can form a color pixel.

Imaging elements 68 may be arranged in configurations other than the rectangular array of FIG. 5 provided that elements 68 continue to be configured in separate imaging lines. For instance, elements 68 can be arranged in an orthogonal (but not fully rectangular) row/column array in which each imaging column contains one element 68 from each alternate imaging row rather than one element 68 from each imaging row. In such a case, the number of elements 68 in one imaging line may differ from that in another imaging line. Also, the imaging lines need not be substantially straight.

Implementations of Image-Producing Flat-Panel Device

Aside from the configuration of imaging elements 68, image-producing component 60 may be implemented in various ways. As further described below in connection with FIGS. 10–15, image-producing component 60 is typically implemented as a generally flat CRT display. Each imaging element 68 then consists of a light-emissive imaging element, normally phosphor, and an oppositely situated electron-emissive imaging region which emits electrons that strike the light-emissive element and cause it to emit light which produces a dot of the image on interior surface 56. Alternatively, component 60 can be implemented as a generally flat LCD, a generally flat plasma display, a generally flat electroluminescent display ("ELD"), a generally flat light-emitting diode ("LED") display, or another generally flat display in which elements 68 of the imaging lines contain phosphor which selectively emits light to produce the display's image. In each of these implementations, component 60 is normally matrix addressed.

When image-producing component 60 is implemented as a generally flat LCD, liquid-crystal material is situated between a backplate structure and a faceplate structure spaced apart from, and extending roughly parallel to, the backplate structure in an active region of the LCD. The backplate and faceplate structures include respective patterned electrically conductive layers, at least one of which is transparent, for controlling light transmission through the liquid-crystal material. The exterior surface of the faceplate structure forms interior surface 56 on which the image is presented. O'Mara, *Liquid Crystal Flat Panel Displays* (Van Nostrand Reinhold), 1993, generally describes LCDs suitable for implementing component 60. The contents of O'Mara are incorporated by reference herein.

An LCD that implements component 60 may be of the transmissive or reflective type. In the transmissive case, the LCD selectively transmits light emitted by a light source in the backplate structure. Each imaging element 68 therefore consists of a light valve containing a portion of the light source and a nearby portion of the liquid-crystal material. The liquid-crystal portion of the light valve is modulated so as to selectively transmit light provided by the associated portion of the light source. In the reflective case, each element 68 selectively transmits ambient light which passed through that element 68 and reflected off part of the backplate structure. Each element 68 of the reflective LCD then consists of a modulated light valve that contains a portion of the liquid-crystal material.

In the case of a generally flat plasma display, image-producing component 60 generates a plasma between a backplate structure and a faceplate structure spaced apart from, and extending roughly parallel to, the faceplate structure in an active display region. The faceplate structure's exterior surface is interior surface 56. Each imaging element 68 may contain a plasma portion that selectively emits light which directly forms at least part of a dot of the image. Alternatively, each element 68 may contain a radiation-emitting plasma portion and a light-emissive imaging element, typically phosphor. The light-emissive element emits light when struck by the radiation, typically electrons or/and light such as ultraviolet light, emitted by the plasma portion. In both situations, each element 68 includes a light-emissive imaging element. Plasma displays suitable for implementing component 60 are described in (a) Curtin et al, "Fundamentals of Emissive Displays," Short Course S-3, Soc. for Info. Display, 11 May 1997, and (b) Tannas, *Flat-panel Displays and CRTs* (Van Nostrand Reinhold), 1985, pages 332–414. Curtin et al and Tannas are incorporated by reference herein.

When image-producing component 60 is implemented as a generally flat ELD, light-emissive material is sandwiched between two patterned electrically conductive layers of a plate structure. At least one of the conductive layers is transparent. Each imaging element 68 contains a portion of the light-emissive material, typically phosphor. Light is emitted by the portion of the light-emissive material in each element 68 when the two conductive layers apply a suitable potential across that light-emissive material. The light passes through a transparent one of the conductive layers to produce the image on interior surface 56 formed by the plate structure's front surface. The ELD may be of the inorganic or organic type. Curtin et al, cited above, describes ELDs suitable for implementing component 60.

In the case of a generally flat LED display, image-producing component 60 consists of a plate structure containing light-emissive imaging diodes that form imaging elements 68. The diodes emit light by electroluminesence. While the LED display may be of the inorganic type, the LED display is typically of the organic type, especially when component 60 is matrix addressed. Organic LED displays suitable for implementing component 60 are described in Curtin et al.

Aside from the above-mentioned flat phosphor-containing displays, other generally flat displays which are suitable for implementing image-producing component 60 and in which phosphor in the imaging lines selectively emits light to produce the image on internal surface 56 include (a) a transmissive liquid-crystal device combined with a phosphor-based light-emitting device and (b) an electron-emitting device which emits electrons by photoemission combined with a phosphor-based light-emitting device.

In the case of a transmissive liquid-crystal device combined with a phosphor-based light-emitting device, the liquid-crystal device selectively transmits light emitted by a light source in a backplate structure of image-producing component 60. The light may be ultraviolet light, visible light, or/and infrared light. The so-transmitted light excites phosphor in a faceplate structure spaced apart from, and extending roughly parallel to, the backplate structure. The faceplate structure's exterior surface forms image-presenting interior surface 56. Each imaging element 68 consists at least of a modulated light valve and a phosphor-containing light-emissive imaging element. The light valve contains a portion of the light source and a nearby portion of liquid-crystal material.

When image-providing component 60 is implemented with an electron-emitting device that emits electrons by photoemission combined with a phosphor-based light-emitting device, the light for causing photoemission of electrons is furnished by a light-providing portion of a backplate structure of component 60. The light-providing portion is typically an electroluminescent device. Alternatively, the light-providing portion can be an LED device, a liquid-crystal device, or a plasma device.

Light furnished by the light-providing portion excites an electron-emitting portion of the backplate structure and causes the electron-emitting portion to emit electrons. The photoemitted electrons are controlled so as to selectively strike phosphor in a faceplate structure spaced apart from, and extending roughly parallel to, the backplate structure. Upon being struck by electrons, the phosphor emits light to produce the display's image on interior surface 56 at the faceplate structure's exterior surface. Each imaging element 68 contains a phosphor-containing light-emissive imaging element and a photoemission-based electron-emissive region formed with parts of the light-providing and electron-emitting portions of the backplate structure.

The preceding flat displays variously employ line-at-a-time activation and line-at-a-time updating for frame duration to update the imaging lines in image-producing component 60. Line-at-a-time activation, which results from passive addressing, is utilized in flat CRT displays to implement component 60. Other types of flat displays that implement component 60 with line-at-a-time activation include passively addressed twisted-nematic and super twisted-nematic LCDs, passively addressed plasma displays, passively addressed ELDs, passively addressed LED displays, including passively addressed organic LED displays, and further passively addressed displays in which phosphor in the imaging lines emits light to produce the display's image, including passively addressed combinations of a phosphor-based light-emitting device and either a transmissive liquid-crystal device or an electron-emitting device which emits electrons by photoemission, and in which light valves are employed to produce the display's image. Forms of the preceding flat displays that implement component 60 with line-at-a-time updating for frame duration include active-matrix LCDs, plasma displays with memory, active-matrix ELDs, active-matrix LED displays, again including active-matrix organic LED displays, and further active-matrix displays in which phosphor in the imaging lines emits light to produce the display's image and in which light valves are utilized to produce the display's image.

Light-providing shutter control section 62 contains a group of laterally separated light-providing shutter control elements 72 which are typically responsive, normally indirectly, to the line selection signals that control the imaging lines. As further discussed below, control elements 72 may alternatively or additionally be responsive to one or more signals employed to generate the line selection signals. Each control element 72 is associated with at least one of the imaging lines. However, no imaging line is normally associated with two or more elements 72. FIGS. 4a, 4b, and 5 depict a typical situation in which each element 72 is associated with precisely one imaging line.

Control elements 72 selectively provide light for controlling light shutter 54 to enable it to enhance the contrast of the imaging lines. Arrow 74 in FIGS. 3, 4b, and 5 indicates light so provided by one of elements 72. This light is of a specified type and of at least a requisite threshold value for the specified type of light. The light is normally visible light but can be infrared or ultraviolet light. The type of light provided by elements 72 for use in achieving the enhanced image contrast is typically limited to a particular wavelength range e.g., the wavelength range for green or infrared light.

For line-at-a-time activation, each control element 72 normally provides light of the specified type and of at least the threshold value whenever at least one imaging line associated with that element 72 is activated regardless of whether imaging elements 68 in each associated activated imaging line are, or are not, actually providing light for creating that line of the image in the desired manner. Hence, each control element 72 normally provides the requisite light even through no imaging element 68 in each associated activated imaging line is actually providing light. In certain cases, each control element 72 provides the requisite light only when at least one imaging element 68 in an associated activated imaging line is providing light for creating part of the image.

Depending on various factors, each control element 72 may, or may not, provide light of the specified type and of at least the threshold value when no associated imaging line is activated. In general and as described further below, certain of elements 72 are often controlled (a) to provide the requisite light when at least one nearby imaging line is activated and (b) to not provide the requisite light when no nearby imaging line is activated. Operating in this manner compensates for switching delays and allows for image persistence under line-at-a-time activation. Also, advance placement of certain parts of light shutter 54 in light-transmissive states, sometimes referred to as advance shutter turn on, can be achieved by operating in the foregoing manner. What constitutes a nearby imaging line is dependent, at least, on the lengths of the switching delays, image persistence, and advance turn-on times, and on the construction of (e.g., number of strips in) shutter 54.

The lateral area occupied by each control element 72 in the schematic illustration of FIGS. 3, 4b, and 5 represents the approximate area across which light of the specified type and of at least the threshold value actually leaves that element 72. The light provided by an element 72 typically leaves element 72 without any significant earlier travel through element 72. The schematic illustration of elements 72 in FIGS. 3, 4b, and 5 represents this typical situation.

In certain cases, the light provided by each control element 72 undergoes significant earlier travel before leaving that element 72. For example, the light provided by an element 72 may be furnished by an outside source rather than being directly emitted by element 72. In some of these cases, the lateral area across which the earlier light travel occurs in an element 72 is approximately the same as the lateral area across which light leaves element 72. The schematic illustration of elements 72 in FIGS. 3, 4b, and 5 also represents this situation.

In other cases where the light provided by each control element 72 undergoes significant travel before leaving that element 72, the lateral area across which the earlier light travel occurs in that element 72 is significantly greater than the light-leaving area of that element 72. The actual lateral boundaries of elements 72 thus go significantly beyond the lateral boundaries schematically illustrated in FIGS. 3, 4b, and 5 for elements 72. The actual lateral boundary for an element 72 may even extend into image-producing component 60.

The lateral areas across which light leaves control elements 72 are typically approximately equal in value. To simply display fabrication, the lateral light-leaving area of each element 72 is typically arranged to be greater than the lateral area of each imaging element 68.

Control elements 72 for each different implementation of image-producing component 60 described above typically provide light in approximately the same way that imaging elements 68 provide light in that implementation of component 60. Control section 62 is basically an extension of, and manufactured largely simultaneously with, component 60. For example, when component 60 is a flat CRT display in which each imaging element 68 consists of an electron-emissive imaging region and an oppositely situated light-emissive imaging element, each control element 72 typically consists of a light-emissive control element and an oppositely situated electron-emissive control region which emits electrons that strike the light-emissive control element and cause it to emit light.

Similar correspondences arise when light-producing component 60 consists of another generally flat display such as a plasma display, an ELD, an LED display, an LCD, or largely any other display in which phosphor of the imaging lines selectively emits light to produce the display's image. Except for (pure) LCDs, each control element 72 in these non-CRT implementations normally contains a light-emissive control element. For a plasma display, each light-emissive control element normally emits light in response to impinging radiation. The light-emissive control element in a plasma display may simply be a plasma portion or may be solid light-emissive material, typically phosphor, which emits light upon being excited by radiation, e.g., electrons or/and light such as ultraviolet light, emitted by a plasma portion. In the case of an ELD, the light-emissive control element in each element 72 normally emits light when a pair of electrical conductors apply a suitable potential across a region of light-emissive material, typically phosphor, situated between the conductors. When light-producing component 60 is formed with an LED display, control elements 72 normally consist of light-emitting diodes which emit light as a result of electroluminesence.

Control elements 72 normally consist of light valves when light-producing component 60 is implemented as an LCD. For a transmissive LCD, each light valve contains (a) a portion of a light source in the display's backplate structure and (b) a liquid-crystal region that selectively transmits light emitted by the portion of the light source. In the reflective LCD case, each element 72 contains a liquid-crystal region that selectively provides light originally produced according to a light-reflective technique. When component 60 consists of a reflective LCD, each element 72 can also be implemented as a transmissive light valve formed with (a) a portion of a light source in the LCD's backplate structure and (b) a liquid-crystal region.

In the case where image-producing component 60 consists of a transmissive liquid-crystal device combined with a phosphor-based light-emitting device, each control element 72 normally consists at least of a modulated light valve and a phosphor-containing light-emissive control element. The light may be ultraviolet, visible, or/and infrared light. The light valve contains a portion of a light source, typically the same light source used in component 60, and a nearby portion of liquid-crystal material. The light-emissive control element emits light upon being excited by light emitted by the light source and selectively transmitted through the liquid-crystal portion.

When image-producing component 60 is formed with an electron-emitting device that emits electrons by photoemission combined with a phosphor-based light-emitting device, each control element 72 normally contains a phosphor-containing light-emissive control element and a photoemission-based electron-emissive region consisting of a light-providing element and an electron-emitting element. The light-providing element furnishes light in normally the same way that the light-providing portion of the backplate structure in component 60 furnishes light. Light furnished by the light-emissive element excites the electron-emissive element and causes it to emit electrons. The light-emissive control element emits light when struck by the photoemitted electrons.

Alternatively, control elements 72 for particular implementations of image-producing component 60 can provide light in ways materially different from the ways in which imaging elements 68 provide light in those implementations. As an example, the light provided by each control element 72 can consist of part of the light provided by each associated activated imaging line. To implement this variation, component 60 and control section 62 contain light pipes that channel light provided from imaging elements 68 to the locations where control elements 72 provide light. The light pipes may be considered part of elements 72. In that case, elements 72 physically extend into component 60.

Light Shutter Configuration and Operation

Light shutter 54 contains a further shutter control section 76 and a shutter component 78 formed primarily with a set of largely parallel shutter strips 80. FIGS. 4a and 5 illustrate the typical situation in which shutter strips 80 are laterally separated from one another. Nonetheless, strips 80 can laterally abut, or/and vertically overlap, one another. Shutter control section 76 and shutter component 78 are situated generally side by side. In a typical implementation, control section 76 and shutter component 78 are parts of a single sealed device. The enhanced-contrast image is visible through strips 80 when they are suitably transmissive of light, and effectively appears at exterior display surface 58.

Light-providing shutter control section 62 and further shutter control section 76 form a composite shutter control component 62/76 that utilizes the light provided by shutter control elements 72 for controlling shutter strips 80. Shutter control section 76 contains a group of further shutter control elements 82, each associated with one or more light-providing shutter control elements 72 situated across from that further control element 82. FIGS. 4b and 5 illustrate a typical example in which each control element 82 is associated with precisely one oppositely located control element 72. Each element 82 and the associated element 72 form a composite shutter control element 72/82.

Each shutter strip 80 is associated with one or more shutter control elements 82 located at one end of that strip 80. Since each light-providing control element 72 is associated with one or more imaging lines, each strip 80 is associated with one or more imaging lines situated across from that strip 80. In other words, each strip 80 is positioned in front of each associated imaging line. Normally, each strip 80 is associated with, and thus is positioned in front of, multiple imaging lines. This situation is depicted in FIG. 5 where, for exemplary purposes, each strip 80 lies in front of two imaging lines.

In the example of FIG. 5, two different further control elements 82 are located at one end of each shutter strip 80 and thus are associated with that strip 80. As a result, each strip 80 is controlled by the two closest composite control elements 72/82. This allocation of elements is arbitrary. Each pair of control elements 82 closest to a strip 80 can be viewed as a single composite shutter control element. In that case, each composite shutter control element in shutter control section 76 and two (in the example of FIG. 5) or more (in the general case) of associated light providing control elements 72 form a larger composite shutter control element for controlling associated strip 80.

Each shutter strip 80 is switchable between a light-transmissive state and a light-absorptive state during display operation. When a strip 80 is in its light-transmissive state, that strip 80 transmits more than a portion $P_{T\text{-}TS}$ of the incident visible light provided from each associated activated imaging line. Any remaining visible light which strikes a strip 80 in its transmissive state after having been provided by any associated activated imaging line is absorbed or reflected (i.e., specularly reflected or scattered). When a strip 80 is in its light-absorptive state, that strip 80 absorbs more than a portion $P_{A\text{-}AS}$ of the incident ambient visible light, i.e., the incident visible light provided from outside the display.

The sum of light-transmissive portion $P_{T\text{-}TS}$ and light-absorptive portion $P_{A\text{-}AS}$ is normally at least 1. For instance, portions $P_{T\text{-}TS}$ and $P_{A\text{-}AS}$ may each be 0.6 so that the sum $P_{T\text{-}TS}+P_{A\text{-}AS}$ is 1.2. Since (a) a shutter strip 80 in its absorptive state absorbs more than portion $P_{A\text{-}AS}$ of the incident ambient visible light, (b) a strip 80 in its transmissive state transmits more than portion $P_{T\text{-}TS}$ of the incident visible light provided from each associated activated imaging line, and (c) some light absorption and reflection invariably occurs when a strip 80 is in its transmissive state, requiring the sum $P_{T\text{-}TS}+P_{A\text{-}AS}$ to be at least 1 invariably results in the transmissive and absorptive states being mutually exclusive. That is, a strip 80 cannot simultaneously be in its transmissive and absorptive states.

Some light transmission typically occurs through shutter strips 80 when they are in their light-absorptive states. In particular, a strip 80 in its absorptive state transmits a portion $P_{T-AS}$ of the ambient visible light incident on that strip 80. Transmissive portion $P_{T-TS}$ for a strip's transmissive state is normally greater than transmissive portion $P_{T-AS}$ for that strip's absorptive state. Additional contrast enhancement is typically achieved when the transmissive difference $P_{T-TS}-P_{T-AS}$ is as little as 0.1. Transmissive difference $P_{T-TS}-P_{T-AS}$ is preferably at least 0.3, more preferably at least 0.6.

Increasing the transmissive difference $P_{T-TS}-P_{T-AS}$ normally causes the sum $P_{T-TS}+P_{A-AS}$ to increase. Although it may sometimes be desirable that transmissive portions $P_{T-TS}$ and $P_{T-AS}$ each be greater than 0.5, the preceding relationships among portions $P_{T-TS}$, $P_{A-AS}$, and $P_{T-AS}$ can be satisfied if one of portions $P_{T-TS}$ and $P_{A-AS}$ is less than 0.5. Specifically, by holding the difference $P_{T-TS}-P_{T-AS}$ constant, transmissive portions $P_{T-TS}$ and $P_{T-AS}$ can both be increased or decreased relatively substantially across the range between 0 and 1. For example, consider the situation in which difference $P_{T-TS}-P_{T-AS}$ is fixed at 0.1. If $P_{T-TS}$ is 0.9 so that $P_{T-AS}$ is 0.8, $P_{A-AS}$ can be no more than 0.2. Similarly, if $P_{A-AS}$ is 0.9 so that $P_{A-TS}$ is no more than 0.1, $P_{T-TS}$ is no more than 0.2. What this qualitatively means is that the fraction of incident light transmitted by a strip 80 when it is in its absorptive state can vary across a relatively wide range provided that a suitably higher fraction of incident light is transmitted by that strip 80 when it is in its transmissive state.

By choosing portions $P_{T-TS}$, $P_{A-AS}$, and $P_{T-AS}$ in the foregoing manner, shutter strips 80 have increased light absorption, and thus increased darkness, in their light-absorptive states compared to their light-transmissive states. When strips 80 are in their absorptive states, they outwardly appear dark, preferably largely black, relative to their transmissive states. The largely black appearance of strips 80 normally arises when transmissive difference $P_{T-TS}-P_{A-AS}$ is at least 0.3. For the reasons discussed below, the image contrast is enhanced.

In certain cases, achieving a desired high value of absorptive portion $P_{A-AS}$ may result in transmissive portion $P_{T-TS}$ being relatively low. If so, the intensity of the image presented on interior surface 56 can be appropriately increased. The contrast in the final image, i.e., that effectively presented on exterior surface 58, can thereby be enhanced significantly without unacceptable loss in the intensity of the final image.

Composite shutter control component 62/76 controls shutter strips 80 generally in the following way. Light provided by control component 62/76 is utilized to switch each strip 80 between its light-transmissive and light-absorptive states. When at least one control element 72 associated with a strip 80 provides light of the specified type and of at least the threshold value, control section 76 places that strip 80 in a selected one of its transmissive and absorptive states. When no element 72 associated with a strip 80 is providing the requisite light, control section 76 places that strip 80 in the other of its transmissive and absorptive states. Preferably, each strip 80 (a) is placed in its transmissive state when at least one associated element 72 provides the requisite light and (b) is placed in its absorptive state when no associated element 72 provides the requisite light.

Shutter control elements 82 function as switches responsive to the light provided from control elements 72 for switching shutter strips 80 between their transmissive and absorptive states. An example of how control elements 82 are implemented to perform this function is presented below in connection with FIGS. 10–15. Strips 80 are generally controlled so that each strip 80 is in its transmissive state during at least part of the period that each imaging line associated with that strip 80 provides light for creating the image in the intended manner.

For line-at-a-time activation, each shutter strip 80 is in its light-transmissive state during largely the entire period in which each associated imaging line is activated and is providing light for creating the image. When no imaging element in an activated imaging line provides light, the imaging line is essentially fully black. Each strip 80 is typically also in its transmissive state when each associated activated imaging line is fully black but, in some embodiments of control component 62/76, may be in its absorptive state when an associated activated imaging line is fully black.

More particularly, a fully black activated imaging line transmits virtually no light. Accordingly, there is basically no contrast to enhance for a fully black activated imaging line. However, the material that forms the outside surfaces of imaging elements 68 in an activated, but fully black, imaging line is typically capable of reflecting some light. If a shutter strip 80 is in its transmissive state even through each associated activated imaging line is fully black, ambient light can pass through that strip 80, be reflected off its imaging elements 68, and then pass back through that strip 80. This reflected light can degrade the contrast for one or more imaging lines behind an adjacent one of strips 80. Under certain circumstances, some enhancement in image contrast can thus be achieved by having each strip 80 be in its absorptive state when each associated activated imaging line is fully black.

In order to place each shutter strip 80 in its absorptive state when each associated activated imaging line is fully black, control component 62/76 generally needs to have a capability for determining when an imaging line is essentially fully black, i.e., none of imaging elements 68 in that line provides light. This capability can, for example, be achieved with the above-described embodiment of control section 62 in which light-providing control elements 72 include light pipes for collecting part of the light provided from imaging elements 68 in each activated imaging line. If each activated imaging line associated with a control element 72 implemented in this way is essentially fully black, that element 72 does not provide light of the specified type and of at least the threshold value. Depending on various factors such as the desired transmissive/absorptive states for strips 80 close to a particular strip 80 having a fully black activated imaging line, control section 76 can utilize the absence of such light to place that particular strip 80 in its absorptive state.

In most of the implementations of control section 62 described above, each control element 72 for the case of line-at-a-time activation provides light of the specified type and of at least the threshold value when each associated imaging line is activated regardless of whether that line is, or is not, essentially fully black. Consequently, each shutter strip 80 is in its transmissive state at least when each associated imaging line is activated without regard to whether that line is actually providing any light for creating the image in the intended manner.

During normal display operation in which a time-varying image is presented on interior surface 56, shutter strips 80 are switched between their transmissive and absorptive states at various times. Consider a typical situation in which flat-panel display 50 is operated so that only one imaging line is in its activated state at any time. Also, for simplicity, ignore the variation of control section 62 in which the fully black nature of an activated imaging line can result in its strip 80 being in the absorptive state. For the reasons given above, at least one strip 80 is in its transmissive state at any time. Two or three or, in some cases, more of strips 80 may simultaneously be in their transmissive states. The remainder of strips 80 are, of course, in their absorptive states. Except for certain relatively limited situations (e.g., when the total number of strips 80 is four or less), the number of strips 80 in their absorptive states is a majority, often a large majority, of strips 80.

The imaging lines are typically activated sequentially in the line-at-a-time activation mode. Referring to FIG. 5, further consider the situation in which the imaging lines are activated sequentially starting from the top of display 50 and moving downward. The image portion produced by activating an imaging line normally persists for a short period after that line has been deactivated. It is desirable that the image persistence be present on exterior display surface 58. Accordingly, shutter strip 80 for each imaging line is normally maintained in its transmissive state for a short period after that line has left its activated state. This persistence typically occurs as one to several nearby imaging lines below the now-deactivated imaging line go through their activation states. If each such nearby lower imaging line is associated with the same strip 80 as the deactivated line, that strip 80 automatically remains in its transmissive state during the persistence of the deactivated line.

If one or more such nearby lower imaging lines are in a different shutter strip 80 than the now-deactivated imaging line, control component 62/76 causes strip 80 for the deactivated line to remain in its transmissive state even through every imaging line associated with that strip 80 is deactivated. In particular, control element 72 for the now-deactivated line typically provides light of the specified type and of at least the threshold value even though that line is deactivated. Two strips 80 are now simultaneously in their transmissive states. When no nearby lower imaging line is activated, control element 72 for the now-deactivated line stops providing the requisite light. Strip 80 for that line switches to its absorptive state.

Each shutter strip 80 is normally controlled to be safely in its transmissive state shortly before the first associated imaging line is activated. The reason for operating in this way is to avoid having shutter turn-on delay, i.e., the amount of time that a strip 80 takes to switch from its absorptive state to its transmissive state, cause that strip 80 to be in its absorptive state when an associated imaging line is activated. Inasmuch as the shutter turn-on delay typically varies somewhat from unit to unit of flat-panel display 50 and can sometimes vary significantly, e.g., due to change in temperature, during the operation of a given unit of display 50, the operation of strips 80 is controlled to allow for the longest normally expected shutter turn-on delay. In other words, each strip 80 begins to switch from its absorptive state to its transmissive state at a time more than the longest normally expected shutter turn-on delay prior to the beginning of the activation of the first imaging line associated with that strip 80.

Placing a strip 80 in its transmissive state prior to activating the first associated imaging line is typically performed in essentially the complementary manner to that utilized for taking advantage of image persistence. Using information that a nearby imaging line above the soon-to-be-activated first imaging line for a strip 80 is activated, control component 62/76 causes that strip 80 to go into its transmissive state. Specifically, control element 72 for the soon-to-to-be-activated imaging line typically provides light of the specified type and of at least the threshold value even through that line is currently deactivated. Both strip 80 for the soon-to-to-be-activated line and the immediately higher strip 80 are simultaneously in their transmissive states.

While the operation of shutter strips 80 has been discussed here with regard to sequential single-line-at-a-time activation, the imaging lines need not be activated sequentially. Similar considerations arise if the imaging lines are activated in a non-sequential single-line-at-a-time mode as, for example, described in Spindt et al, U.S. patent application Ser. No. 08/683,789, filed 18 Jul. 1996, now U.S. Pat. No. 5,898,266. The contents of Spindt et al are incorporated by reference herein. Also, multiple imaging lines can be activated simultaneously. In the case of multiple-line-at-a-time activation, the average number of shutter strips in their transmissive states may be increased.

In any event, by having certain of shutter strips 80 in their absorptive states, an increased fraction of the ambient light impinging on flat-panel display 50 strikes those strips 80 and is absorbed rather than being reflected from underlying material such as underlying light-emissive elements 68. The increased absorption-to-reflection ratio enhances the contrast between (a) each imaging line located behind a strip 80 in its transmissive state and (b) each imaging line located behind a strip 80 in its absorptive state. The enhanced image contrast is particularly critical in high ambient lighting conditions where, in a flat-panel display comparable to display 50 but lacking the present mechanism for enhancing imaging contrast, the higher fraction of reflected light can severely degrade the image.

When line-at-a-time updating for frame duration is utilized to update the imaging lines, each shutter strip 80 is in its light-transmissive state for only part of the period, i.e., largely the frame duration, in which each imaging line associated with that strip 80 is providing light for creating the image. For each imaging line, the portion of the frame duration in which associated strip 80 is in its light-transmissive state is appropriately chosen and typically consists of an initial, or early, part of that line's frame duration. In the case where image-producing component 60 is implemented with an LCD or a plasma display that employs line-at-a-time updating for frame duration, the human eye may perceive some smear in the image that appears on internal surface 56 due to the presentation of each line of the image for the frame duration. Appropriate switching of strips 80 between the light-transmissive and light-absorptive state serves to alleviate the smear and improves the image effectively presented on exterior surface 58.

Shutter Synchronization to Image-Producing Component

The imaging lines are updated in a desired order in response to a multiplicity of line selection signals. Each imaging line is normally controlled by a different one of the line selection signals. In accordance with the invention, light-providing control elements 72 are typically operated in response to, normally in indirect response to, the line selection signals or/and to one or more signals utilized in generating the line selection signals. As a result, the switching of shutter strips 80 is typically controlled by the signals that control the imaging lines or/and the signal(s) employed in generating the signals that control the imaging lines.

By controlling shutter strips 80 with the same signals, i.e., the line selection signals, that control the imaging lines, shutter component 78 is automatically synchronized to image-producing component 60. Assuming (as is normally the case) that the rising and/or falling edges of the line selection signals approximately follow selected rising and/or falling edges of the signal(s) utilized in generating the line selection signals, largely the same arises when strips 80 are controlled with the signal(s) employed in generating the signals that control the imaging lines. There is no need to signal-wise match shutter component 78 to image-producing component 60. Synchronization difficulties between components 60 and 78 are avoided.

The timing in image-producing component 60 may change for various reasons. For instance, change in ambient temperature may cause the timing in component 60 to change. In fact, component 60 may have a capability for suitably modifying its timing in response to change in ambient temperature. If the timing is adjusted in component 60 for reasons such as temperature change, the timing in shutter component 78 automatically follows suit.

More particularly, consider what happens in the case of line-at-a-time activation. Since shutter strips 80 are controlled with the same signals that control the imaging lines, compensation for image persistence automatically occurs so that each strip 80 remains in its transmissive state during the image persistence of each associated recently deactivated imaging line even though the timing may vary. Likewise, despite variation in the timing, compensation automatically occurs for shutter turn-on delay so that each strip 80 begins to switch to its transmissive state at a time more than the longest normally expected shutter turn-on delay prior to the beginning of the activation of the first associated imaging line. Strips 80 therefore switch between their transmissive and absorptive states substantially precisely when desired.

Further consider the situation in which control elements 72 operate specifically in response to the line selection signals. Each element 72 can be controlled by only one of the line selection signals. However, arranging for each shutter strip 80 (a) to be in its transmissive state suitably in advance of the activation of the first associated imaging line and/or (b) to remain in its transmissive state for a sufficiently long period after the last associated imaging line has been deactivated in order to account for image persistence often entails utilizing multiple ones of the line selection signals to control each control element 72 or to control each of certain elements 72. In view of this and the fact that each strip 80 is typically located in front of multiple imaging lines, each strip 80 thus typically operates in response to multiple line selection signals.

Figure 6:
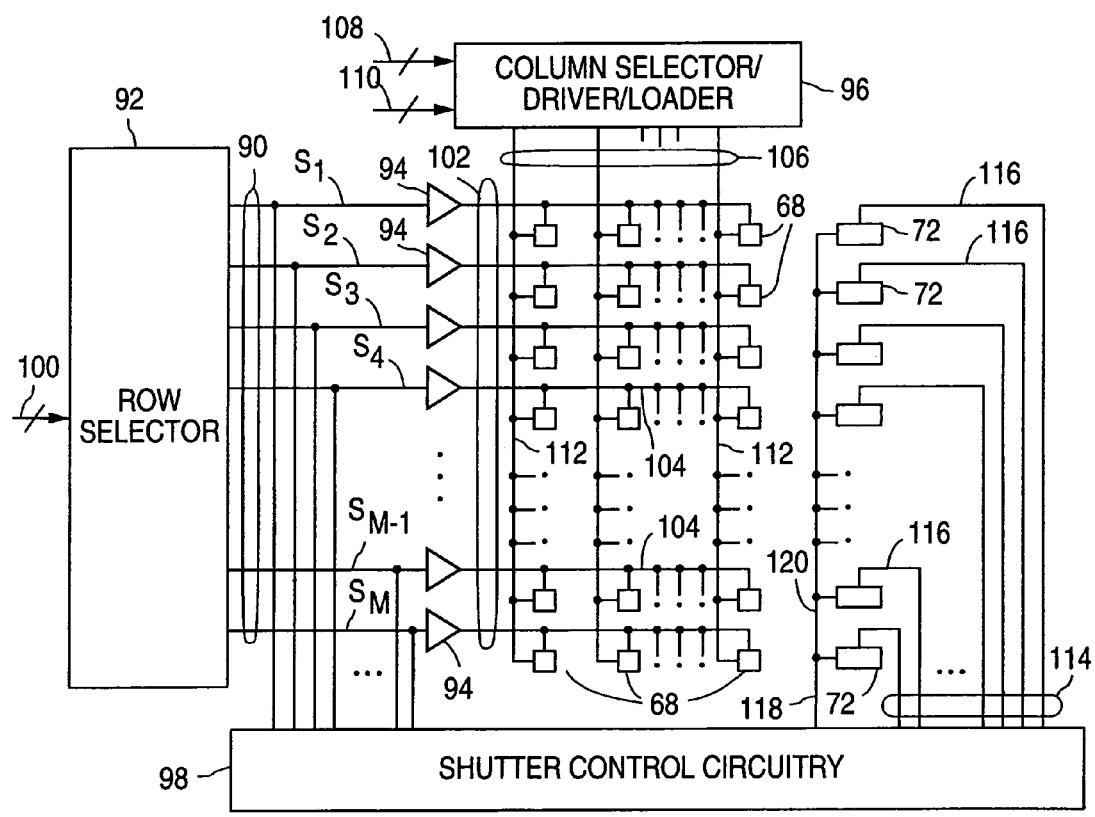
FIG. 6 is a block diagram of an implementation of electronic circuitry for presenting the image and controlling the light shutter in the exemplary flat-panel display of FIG. 5.

FIG. 6 illustrates an example of electronic circuitry that utilizes a multiplicity of line selection signals 90 for controlling the imaging lines and shutter strips 80 in the embodiment of FIG. 5 according to the invention. The electronic circuitry of FIG. 6 applies particularly to line-at-a-time activation. FIG. 6 depicts imaging elements 68 and control elements 72 respectively located in image-producing component 60 and control section 62. Aside from certain electrical lines, the remainder of the circuitry in FIG. 6 forms part of electronic circuitry 64. The remaining circuitry includes a row selector 92, a row driver 94, a column selector/driver/loader 96, and shutter control circuitry 98. Although row selector 92 and shutter control circuitry 98 are shown as separate blocks in FIG. 6, they may be merged together.

Figure 7:
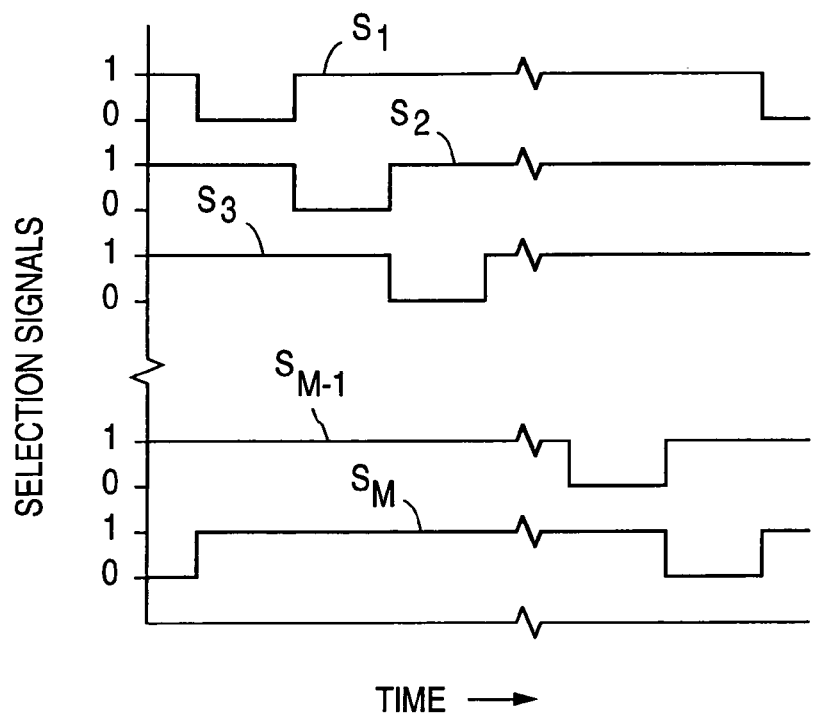
FIGS. 7 and 8 are typical timing diagrams for selection signals in the electronic circuitry of FIG. 6.
Figure 8:
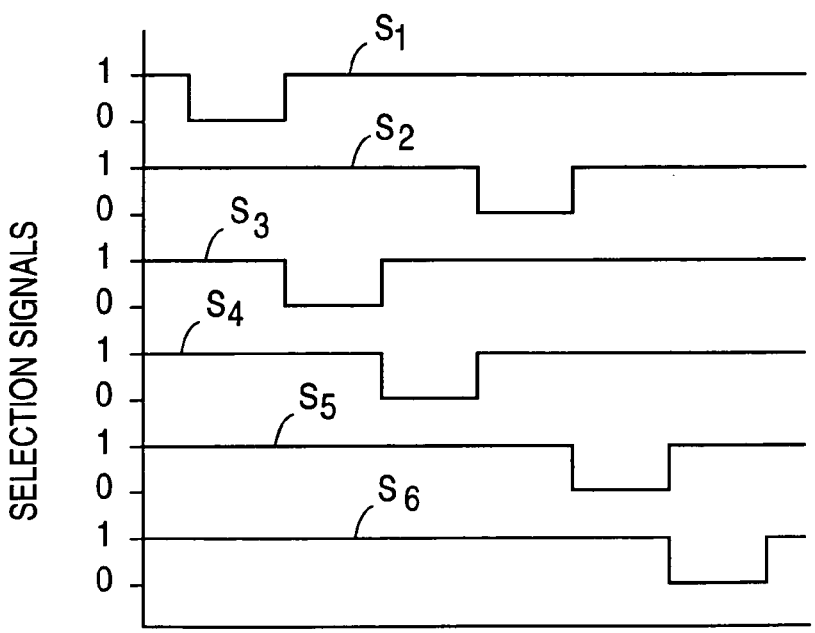

Line selection signals 90 consist of M individual line selection signals $S_1$, $S_2$, . . . $S_M$, where integer M is the number of imaging lines. FIG. 7 depicts an example of how selection signals $S_1$–$S_M$ appear when the imaging lines are activated sequentially one line at a time. Each imaging line is activated when its selection signal $S_j$ is at a selection (or activation) condition, where j is an integer varying from 1 to M. In FIG. 7, the selection condition for each signal $S_j$ is a low value represented as "0". Each imaging line is deactivated when its signal $S_j$ is at a deselection (or deactivation) condition. For each signal $S_j$ in FIG. 7, the deselection condition is a high value represented as "1". FIG. 8 depicts an example of how signals $S_1$–$S_M$ may appear when the imaging lines are activated in a non-sequential one-line-at-a-time activation mode of, for instance, the type described in Spindt et al, U.S. patent application Ser. No. 08/683,789, cited above.

Row selector 92 generates line selection signals 90 in response to a group of line selection generation signals 100. Row drivers 94 amplify selection signals 90 to produce respective amplified line selection signals 102. Each amplified selection signal 102 is supplied on a corresponding one of row imaging electrodes 104 to imaging elements 68 of a different one of the imaging lines. Amplified signals 102 directly control the activation of the imaging lines.

Column selector/driver/loader 96 generates a multiplicity of column data signals 106 in response to column control signals 108 and image data signals 110. Each column data signal 106 is supplied on a corresponding one of column imaging electrodes 112 to imaging elements 68 in a different one of the columns. When a line selection signal $S_j$ goes to its selection condition, e.g., a "0" in the timing diagram of FIG. 7 or 8, column data signals 106 are provided to the activated imaging line to cause it to provide a line of the image.

Shutter control circuitry 98 generates a multiplicity of first shutter control signals 114 in response to line selection signals 90. Control circuitry 98 may also operate in response to other signals (not shown). Each shutter control signal 114 can, for example; be the logical OR of two or more of selection signals 90. Alternatively, control circuitry 98 can generate control signals 114 in response to amplified selection signals 102. In either case, each control signal 114 is provided on a corresponding one of first control electrodes 116 to a different one of control elements 72.

Control circuitry 98 also typically provides a second shutter control signal 118. Alternatively, column selector/driver/loader 96 can supply shutter control signal 118. In any event, control signal 118 is provided on a second control electrode 120 to all of control elements 72. Control signal 118 is of such a value during display operation that placing any first control signal 114 in a selection (or activation) condition results in light of the specified type and of at least the threshold value being provided from corresponding control element 72. In a typical implementation, second control signal 118 is a substantially fixed voltage. Control signal 118 can be deleted in some embodiments.

Each first control signal 114 is in a selection condition when, as determined by control circuitry 98, any of a pre-specified one or more of selection signals 90 is placed in its selection condition. If signals 90 have timing characteristics of the type shown in FIG. 7 or 8, the selection condition for each control signal 114 is normally a low value. Placing each signal 114 in its selection condition normally causes corresponding control element 72 to provide the light needed to place its shutter strip 80 in the transmissive state.

Each control signal 114 is in a deselection (or deactivation) condition when each of that signal's one or more pre-specified selection signals 90 is in its deselection condition. If signals 90 have timing characteristics of the type shown in FIG. 7 or 8, the deselection condition for each control signal 114 is a high value. Placing a signal 114 in its deselection condition normally causes corresponding control element 72 to cease providing the light needed to place its shutter strip 80 in the transmissive state. By utilizing selection signals 90 to control the switching of control signals 114 in this way, strips 80 are switched between their transmissive and absorptive states in response to signals 90.

Figure 9:
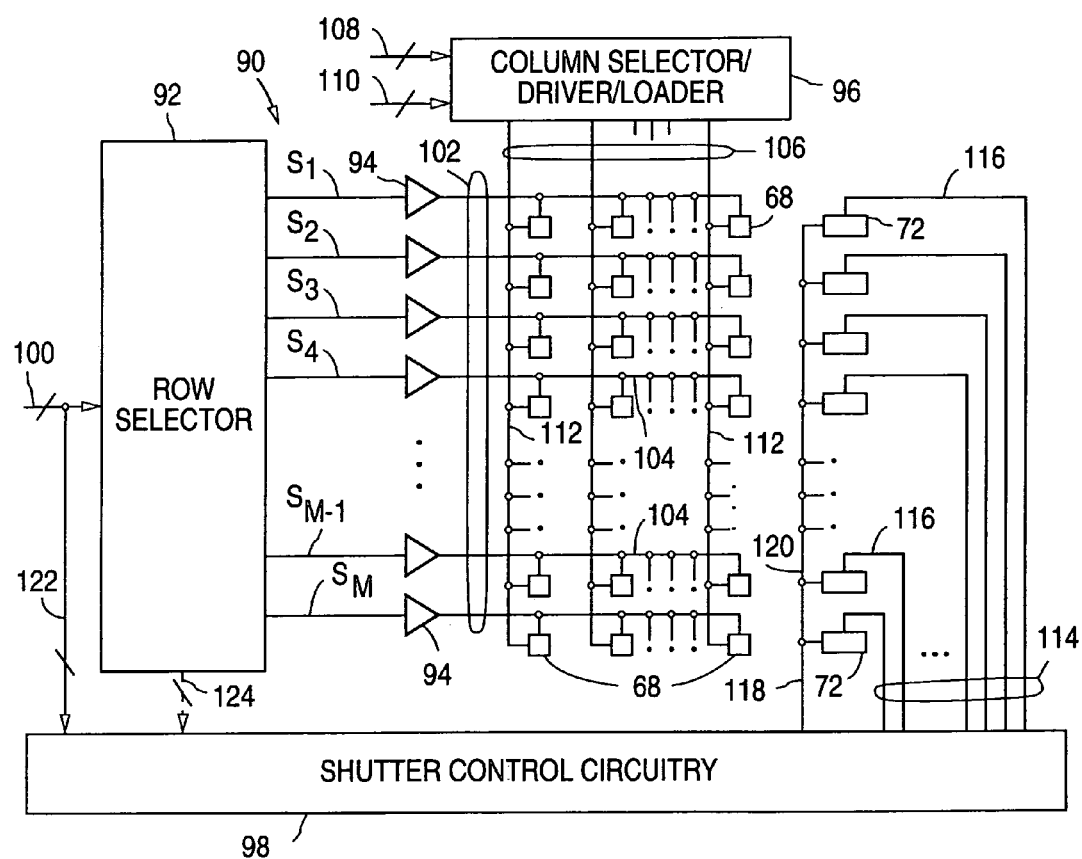
FIG. 9 is a block diagram of another implementation of electronic circuitry for presenting the image and controlling the light shutter in the exemplary flat-panel display of FIG. 5.

FIG. 9 depicts an example of electronic circuitry in which shutter strips 80 in the embodiment of FIG. 5 are controlled according to the invention by one or more of line selection generation signals 100 from which line selection signals 90 are generated. Except as described below, the circuitry in FIG. 9 is configured the same, and operates in the same manner, as the circuitry in FIG. 6. The electronic circuitry of FIG. 9 applies specifically to line-at-a-time activation.

In the circuitry of FIG. 9, one or more selection generation signals 122 (collectively "selection generation signal 122") are provided to shutter control circuitry 98. Selection generation signal 122 constitutes part or all of selection generation signals 100. Generation signal 122 may be a clock signal or a pair of complementary clock signals. One or more signals 124 (collectively "signal 124") consisting of one or more of line selection signals 90 may also be furnished to circuitry 98.

Shutter control circuitry 98 generates first shutter control signals 114 and, when present, second shutter control signal 118 in response to selection generation signal 122 and, when supplied to circuitry 98, selection signal 124. Since control circuitry 98 operates on selection generation signal 122, circuitry 98 is normally internally configured somewhat differently in the circuitry of FIG. 9 than in the circuitry of FIG. 6. Also, circuitry 98 and row selector 92 may be merged together. In this case, selection signal 124 may not be present as a distinguishable signal. In any event, the net result is that light-providing control elements 72, and thus shutter strips 80, are controlled in response to selection generation signal 122 utilized in generating line selection signals 90.

Liquid-crystal Implementations of Light-Shutter for Flat CRT Display

Figure 10:
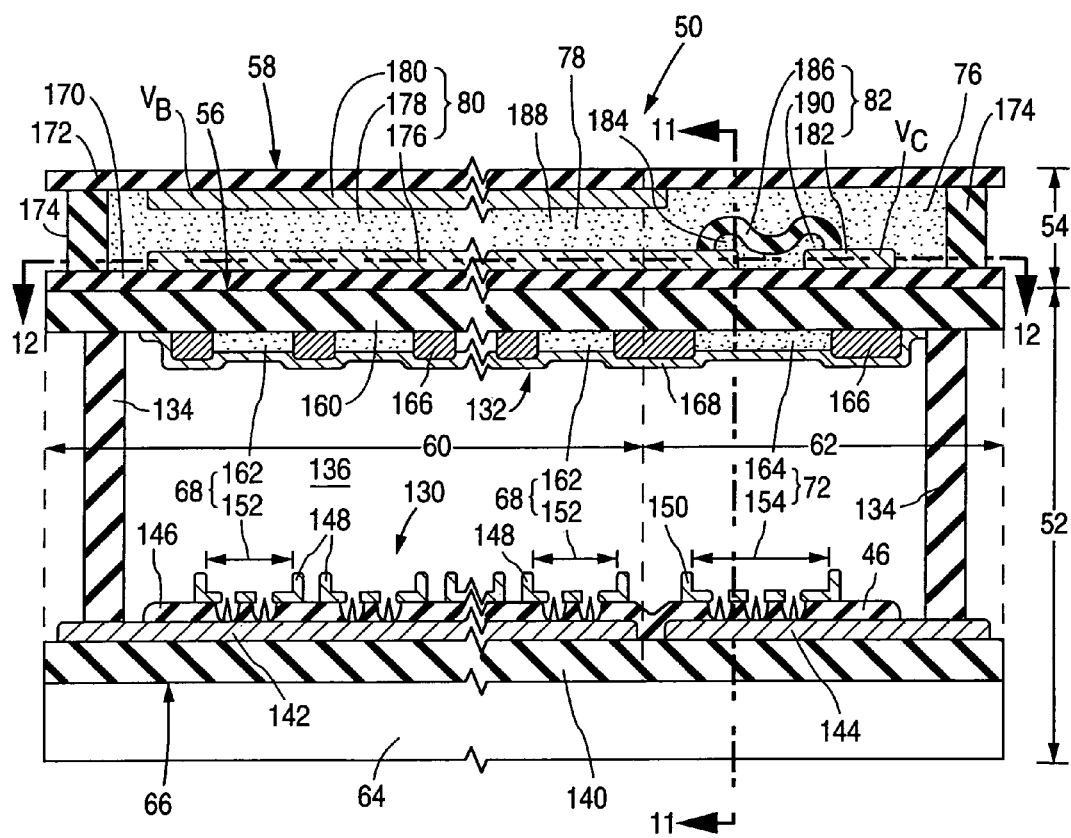
FIGS. 10 and 11 respectively are cross-sectional front and side views of an implementation of the flat-panel display of FIGS. 3, 4a, 4b, and 5 in which the image-producing component consists of a flat CRT display and in which the light shutter consists of a rapidly switchable LCD structure.
Figure 11:
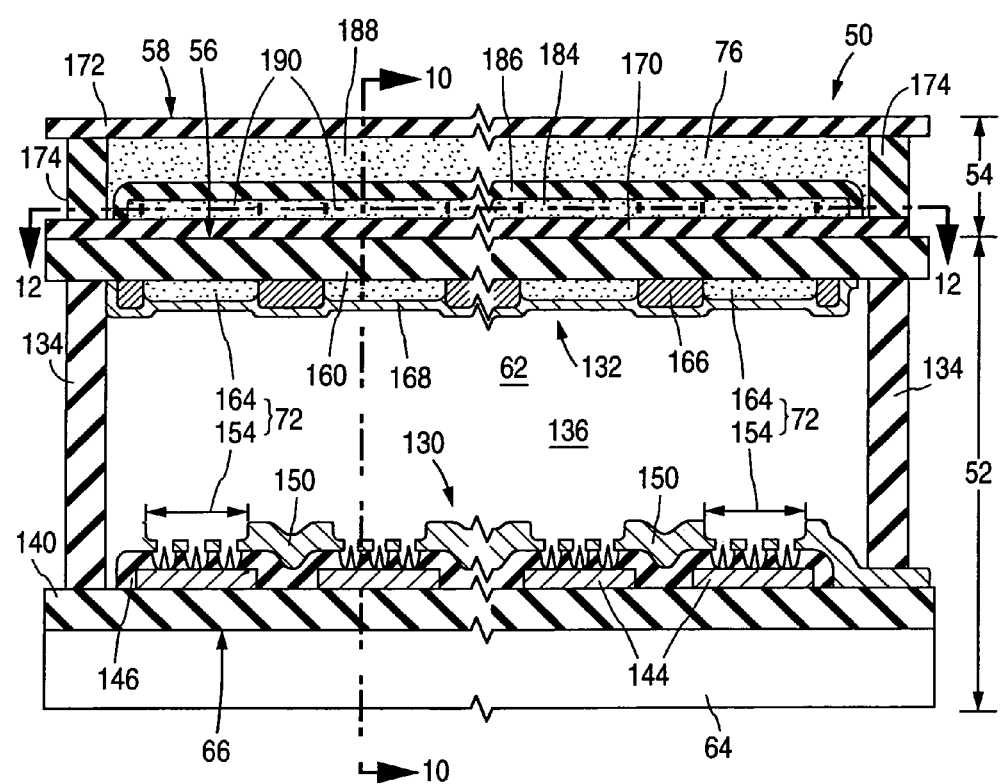
Figure 12:
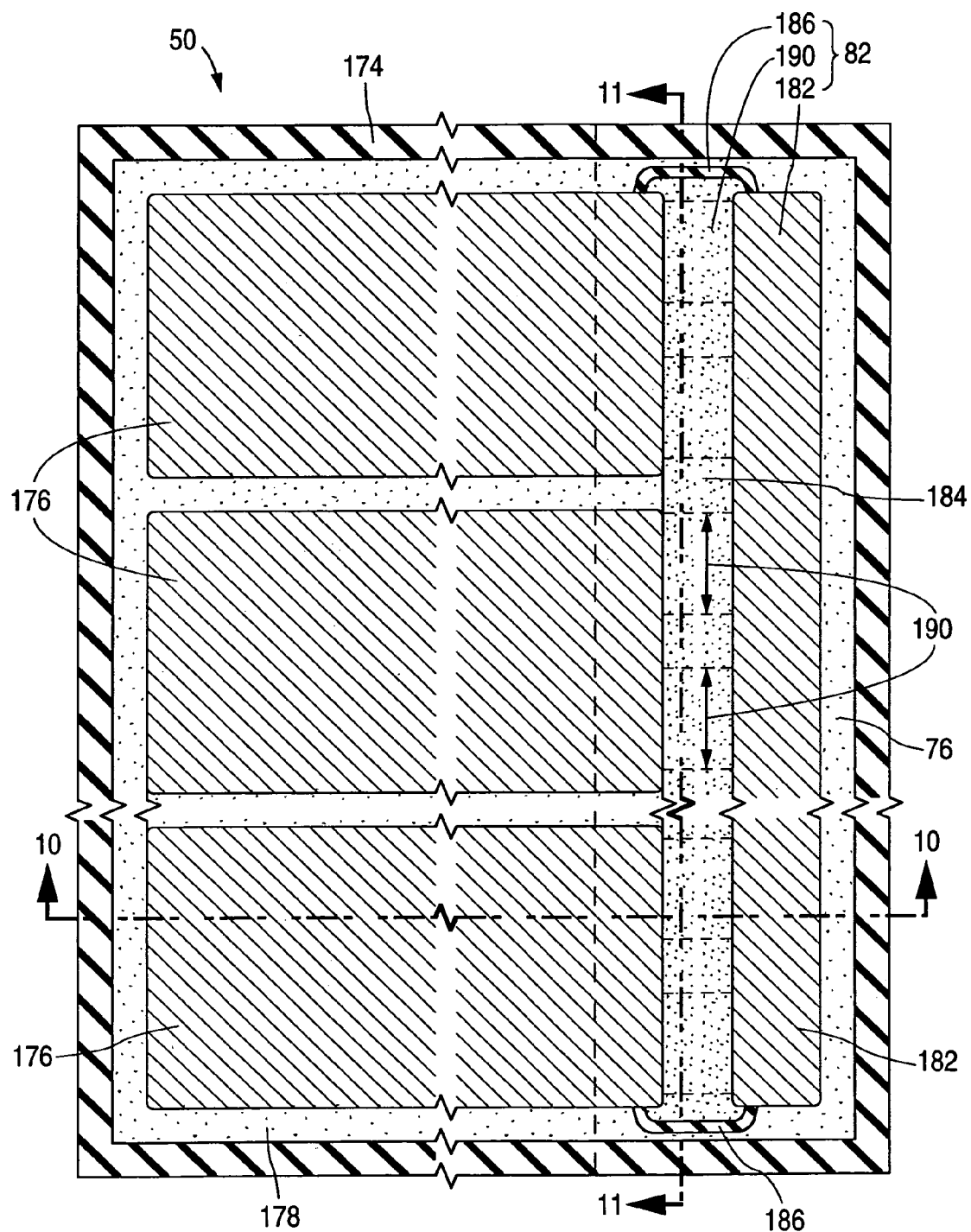
FIG. 12 is a cross-sectional layout view of the flat-panel display in FIGS. 10 and 11. The cross section of FIG. 10 is taken through plane 10—10 in FIGS. 11 and 12. The cross section of FIG. 11 is taken through plane 11—11 in FIGS. 10 and 12. The cross section of FIG. 12 is taken through plane 12—12 in FIGS. 10 and 11.

FIGS. 10 and 11 present intersecting cross sections of one implementation, in accordance with the invention, of flat-panel display 50 in which image producing flat-panel device 52 is a generally flat CRT display of the field-emission type and in which light shutter 54 consists of a liquid-crystal structure. The cross section of FIG. 10 generally corresponds to FIG. 3. The cross section of FIG. 11 generally corresponds to FIG. 4b. FIG. 12 presents a layout view of light shutter 54 in the implementation of FIGS. 10 and 11.

Image-producing component 60 in the implementation of FIGS. 10–12 utilizes line-at-a-time activation. Component 60 here constitutes a main portion of the field-emission CRT display, while control section 62 is an extension of the field-emission display ("FED"). For convenience, component 60 and section 62 are referred to here jointly as FED structure 60/62. Electronic circuitry 64 constitutes a back portion of the FED in FIGS. 10–12.

FED structure 60/62 contains an FED backplate structure 130, an FED faceplate structure 132, and an outer wall 134. Backplate structure 130 and faceplate structure 132 are spaced apart from, and extend generally parallel to, each other. Plate structures 130 and 132 are connected to each other through outer wall 134, typically rectangular, to form a sealed enclosure 136 maintained at a vacuum pressure level, typically $10^{-6}$ torr or less. The exterior surfaces of plate structures 130 and 132 respectively form interior surface 56 and lower FED surface 66. FED structure 60/62 also normally contains further features (not shown) such as spacers for resisting external forces exerted on FED structure 60/62, a system for focusing electrons, and one or more getters.

Backplate structure 130 consists of a generally flat electrically insulating FED backplate 140, a patterned lower electrically non-insulating imaging emitter region 142, a patterned lower electrically non-insulating control emitter region 144, a dielectric layer 146, a multiplicity of imaging column electrodes 148, a control column electrode 150, an array of rows and columns of laterally separated electron-emissive imaging regions 152, and a column of laterally separated electron-emissive control regions 154. Lower non-insulating regions 142 and 144 lie on the interior surface of backplate 140 respectively in component 60 and section 62. Non-insulating imaging region 142 contains a multiplicity of row electrodes (not separately shown) corresponding to row electrodes 104 in FIG. 6. Non-insulating control region 144 similarly contains a multiplicity of first control electrodes (not separately shown) corresponding to first control electrodes 116 in FIG. 6. A resistive layer (also not separately shown) typically overlies the row and first control electrodes.

Dielectric layer 146 lies on lower non-insulating regions 142 and 144. Imaging column electrodes 148, which correspond to column electrodes 112 in FIG. 6 are situated on dielectric layer 146 in component 60. Each electron-emissive imaging region 152 consists of multiple electron-emissive elements situated in openings in dielectric layer 146 and exposed through openings in an imaging column electrode 148. Further control electrode 150, which corresponds to second control electrode 120 in FIG. 6, is situated on dielectric layer 146 in section 62. Each electron-emissive control region 154 consists of multiple electron-emissive elements situated in openings in dielectric layer 146 and exposed through openings in control column electrode 150. The electron-emissive elements in regions 152 and 154 are, for the purpose of example, illustrated as being generally conical in shape. As FIG. 10 indicates, each electron-emissive control region 154 occupies greater lateral area than each electron-emissive imaging region 152.

Faceplate structure 132 contains a generally flat electrically insulating transparent FED faceplate 160, an array of rows and columns of laterally separated light-emissive imaging elements 162, a column of laterally separated light-emissive control elements 164, a border region 166, and a thin light-reflective anode layer 168. Light-emissive imaging elements 162 lie on the interior surface of faceplate 160 in component 60 respectively across from electron-emissive imaging regions 152. Each light emissive element 162 and the oppositely situated electron-emissive region 152 form an imaging element 68. Light-emissive control elements 164 lie on the interior faceplate surface in section 62 respectively across from electron-emissive control regions 154. Each light-emissive element 164 and the oppositely situated electron-emissive region 154 form a control element 72.

Border region 166 lies on the interior faceplate surface and laterally surrounds each of light-emissive elements 162 and 164. Region 166 is a black matrix consisting of material which outwardly appears largely black and which is substantially non-emissive of electrons emitted by electron-emissive regions 152 and 154. Anode layer 168 lies on top of light-emissive elements 162 and 164 and black matrix 166.

During display operation, electron-emissive imaging regions 152 selectively emit electrons under control of (a) selection signals 90 provided on the row electrodes in lower non-insulating imaging emitter region 142 and (b) column data signals 106 provided on imaging column electrodes 148. Electron-emissive control regions 154 similarly selectively emit electrons under the control of (a) first control signals 114 provided on the first control electrodes in lower non-insulating control emitter region 144 an (b) second control signal 118 provided on control column electrode 150. Column electrodes 148 and 150 selectively extract electrons respectively from electron-emissive regions 152 and 154.

Anode layer 168 attracts the electrons towards faceplate structure 132. Large portions of the electrons emitted by regions 152 and 154 respectively strike the oppositely situated ones of elements 162 and 164, causing them to emit light that passes through faceplate 160. The light emitted by light-emissive imaging regions 162 provides the image on interior surface 56 according to line-at-a-time activation. The light emitted by light-emissive control regions 164 is utilized to control light shutter 54.

Light shutter 54 in the example of FIGS. 10–12 contains a generally flat electrically insulating transparent LCD backplate 170, a generally flat transparent LCD faceplate 172, an outer wall 174, a set of transparent laterally separated first electrical conductors 176, liquid-crystal material 178, a transparent second electrical conductor 180, a third electrical conductor 182, a light-sensitive switching layer 184, and a protective layer 186. Backplate 170 is situated on faceplate 160 of FED structure 60/62. Backplate 170 and faceplate 172 are spaced apart from, and extend generally parallel to, each other. Plates 170 and 172 are connected together through outer wall 174, typically rectangular, to form a sealed enclosure 188.

First conductors 176 constitute thin generally parallel strips lying on the interior surface of backplate 170 and extending in the direction of the imaging lines. Each conductor 176 overlies one or more of the imaging lines and has a lateral perimeter that defines the lateral parameter for a corresponding shutter strip 80 in shutter component 78. Second conductor 180 is a thin sheet lying on the interior surface of faceplate 172 across from first conductors 176. Conductor 180 is typically a single, unperforated piece of material but, if desired, can be patterned into a set of strips respectively matching first conductors 176. In any event, a portion of second conductor 180 is situated fully across from each first conductor 176. Conductors 176 and 180 each typically consist of indium tin oxide, tin oxide, or other transparent electrically conductive material.

Liquid-crystal material 178 is situated in the portions of sealed enclosure 188 not occupied by conductors 176 and 180 and the other LCD elements. In particular, part of liquid crystal 178 lies between second conductor 180 and each first conductor 176. Each shutter strip 80 consists basically of one first conductor 176, the oppositely situated portion of second conductor 180, and the intervening part of liquid crystal 178. The overlying portion of faceplate 172 and the underlying portion of backplate 170 may also be considered parts of that strip 80.

Third conductor 182 and light-sensitive switching layer 184 both lie on the interior surface of backplate 170 in control section 76. Conductor 182 and switching layer 184 are thin strips typically extending roughly perpendicular to first conductors 176. Third conductor 182 typically consists of the same material as first conductors 176 and thus is typically transparent.

Third conductor 182 is laterally separated from first conductors 176 in the implementation of FIGS. 10–12. Switching layer 184 physically connects conductor 182 to each of conductors 176. More particularly, switching layer 184 is allocated into a group of switching portions 190 respectively corresponding to control elements 72. Switching portions 190 are illustrated in dashed lines in FIGS. 11 and 12. Each switching portion 190 is located opposite light-emissive control element 164 in corresponding control element 72.

Switching portions 190 are connected to one another through other parts of switching layer 184 in the example of FIGS. 10–12. If desired, switching layer 184 can be patterned so as to physically separate portions 190 from one another. In any event, each first conductor 176 physically adjoins one or more associated switching portions 190. In the example of FIGS. 10–12, each first conductor 176 is connected through two associated switching portions 190 to third conductor 182.

Switching layer 184 consists of light-sensitive material which, upon being irradiated by the above-mentioned light of the specified type and of at least the threshold value, reversibly switches from a specified one of an electrically insulating condition and an electrically conductive condition to the other of these two conditions. Since the light-sensitive material is reversibly switchable, it returns to the specified condition where it ceases to be irradiated by the requisite light provided, of course, that the material is not otherwise inhibited from returning to the specified condition. The light-sensitive material that forms switching layer 184 is typically amorphous semiconductor material, such as amorphous silicon, which reversibly switches from an electrically insulating condition (the specified condition here) to an electrically conductive condition (the other condition here) when irradiated by sufficient visible light, typically visible light of a specified wavelength or a selected wavelength range such as the 500–550-nm wavelength range of green light.

Protective layer 186 overlies switching layer 184 and suitably prevents ambient light from striking layer 184. Consequently, substantially only light provided by control elements 72 can strike switching layer 184. Protective layer 186 lies directly on layer 184 in the example of FIGS. 10–12. Layer 186 then consists of opaque electrically insulating material. Each shutter control element 82 consists basically of third conductor 182, one switching portion 190, and the adjoining portion of protective layer 186.

Alternatively, layer 186 can lie on interior surface of faceplate 172. While still being opaque, the material that forms layer 186 can then be insulating or/and non-insulating. Also, layer 186 can be light reflective when it lies on the interior surface of faceplate 172. Light which is supplied by control elements 72 and passes through switching layer 184 can then be reflected back to layer 186 to improve the switching efficiency.

Figure 13:
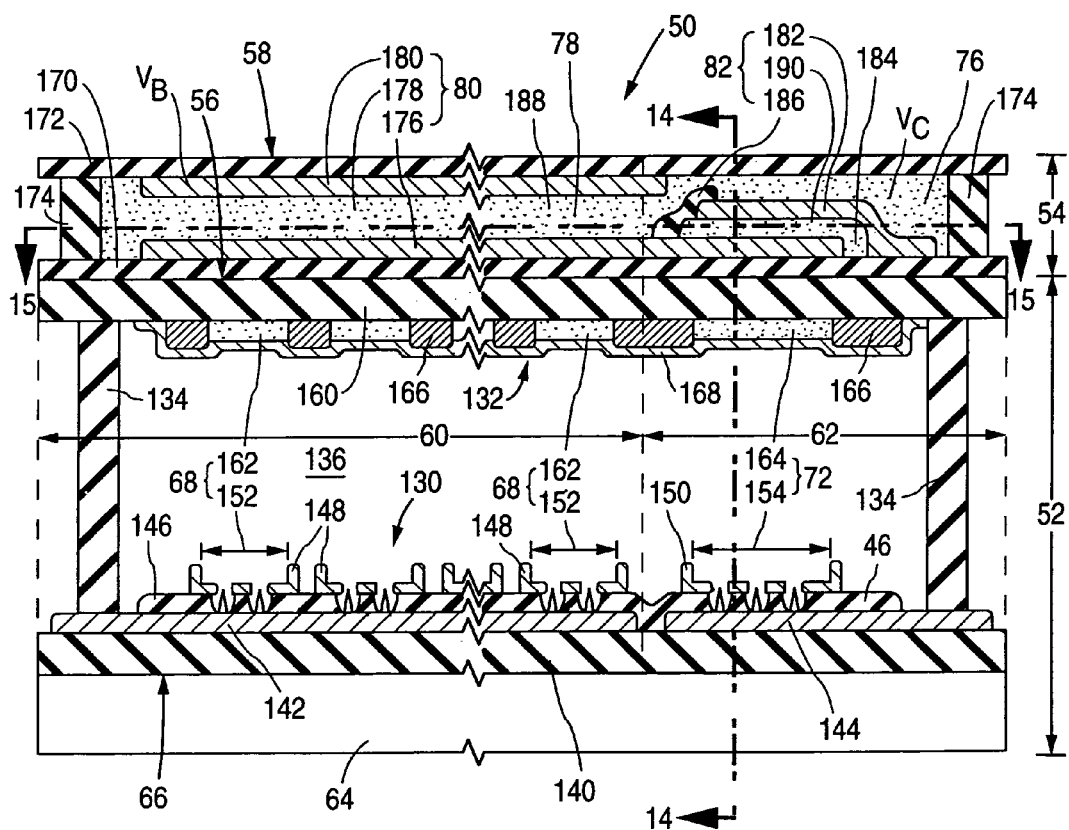
FIGS. 13 and 14 respectively are cross-sectional front and side views of another implementation of the flat-panel display of FIGS. 3, 4a, 4b, and 5 in which the image-producing component consists of a flat CRT display and in which the light shutter consists of a rapidly switchable LCD structure.
Figure 14:
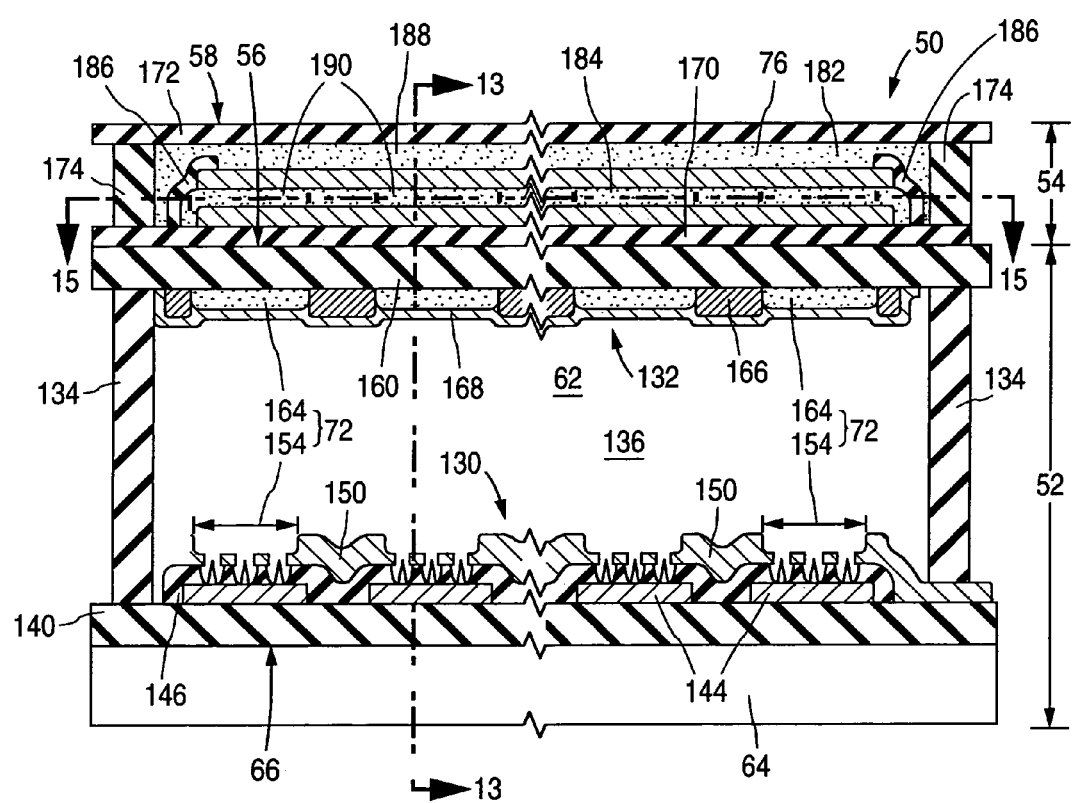
Figure 15:
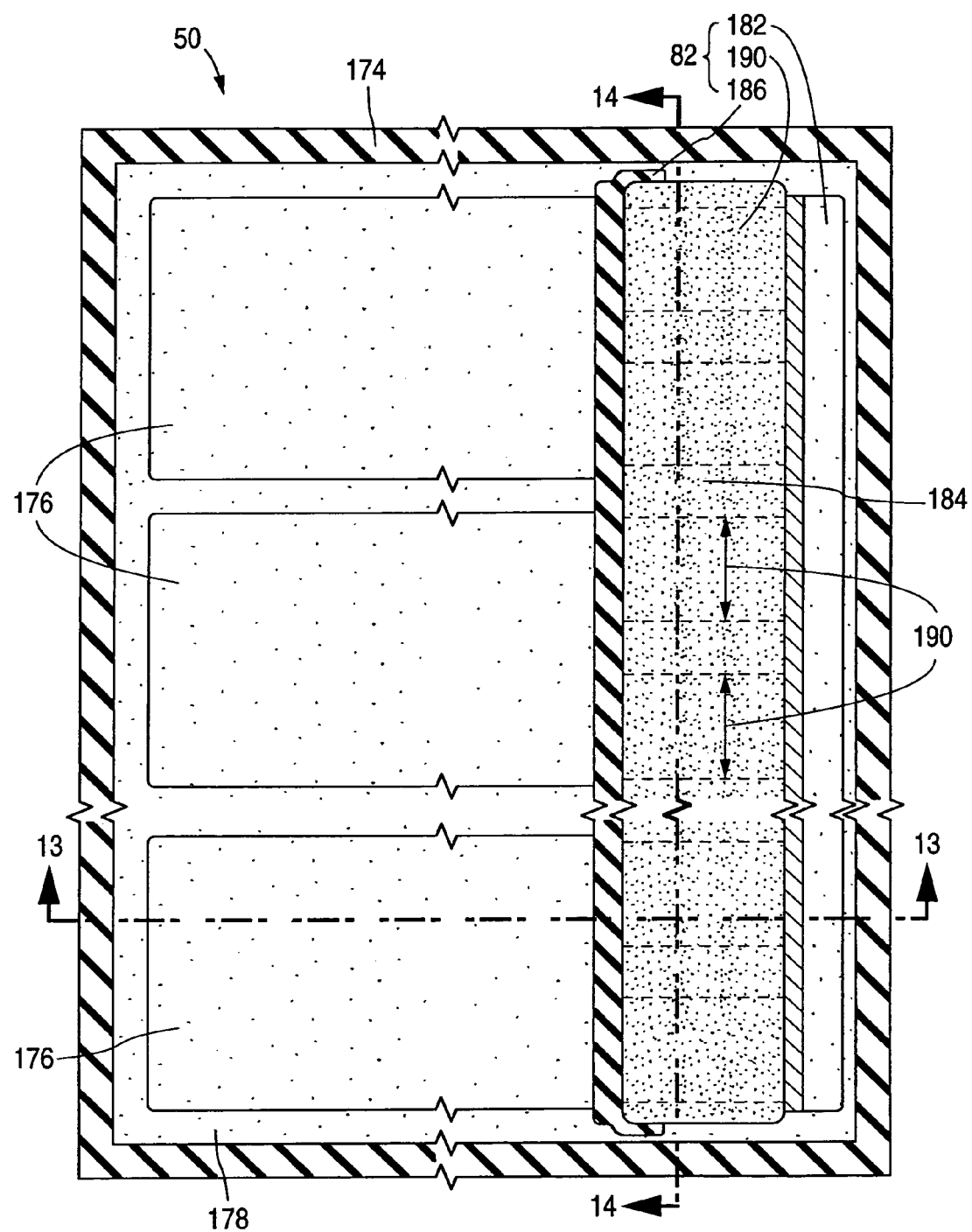
FIG. 15 is a cross-sectional layout view of the flat-panel display in FIGS. 13 and 14. The cross section of FIG. 13 is taken through plane 13—13 in FIGS. 14 and 15. The cross section of FIG. 14 is taken through plane 14—14 in FIGS. 13 and 15. The cross section of FIG. 15 is taken through plane 15—15 in FIGS. 13 and 14.

FIGS. 13 and 14 present intersecting cross sections of another implementation, in accordance with the invention, of flat-panel display 50 in which image-producing flat-panel device 52 is a generally flat field-emission CRT display and in which light shutter 54 consists of a liquid-crystal structure. The cross section of FIG. 13 generally corresponds to FIG. 3. The cross section of FIG. 14 generally corresponds to FIG. 4b. FIG. 15 presents a layout view of light shutter 54 in the implementation of FIGS. 13 and 14.

Image-producing component 60 and control section 62, again jointly FED structure 60/62, in the implementation of flat-panel display 50 in FIGS. 14–15 are configured and operable the same as in the implementation of display 50 in FIGS. 10–12. Line-at-a-time activation is again utilized to update the imaging lines. Shutter component 78 of light shutter 54 in the implementation of display 50 in FIGS. 13–15 is configured and operable the same as in the implementation of display 50 in FIGS. 10–12 except that first conductors 176 are typically slightly longer in the implementation of FIGS. 13–15. The increased length of conductors 176 occurs in control section 76 of shutter 54. The basic difference between the two implementations arises in control section 76 where each shutter control element 82 is in a functionally vertical configuration in the implementation of FIGS. 13–15 rather than in a functionally lateral configuration as occurs in the implementation of FIGS. 10–12.

More particularly, control section 76 in the implementation of FIGS. 13–15 contains components 182, 184, and 186. In this case, third conductor 182 is spaced vertically apart from first conductors 176 opposite control elements 72. Switching layer 184 is sandwiched vertically between third conductor 182, on one hand, and conductors 176, on the other hand.

First conductors 176 lie fully on the interior surface of backplate 170 in the specific example of FIGS. 13–15. Switching layer 184 lies on conductors 176 and extends over the control-side ends of conductors 176, i.e., over the ends of conductors 176 located in control section 76. Third conductor 182 lies on switching layer 184 and extends down to backplate 170 beyond the control-side ends of conductors 176. Conductor 182 can be light reflective so as to reflect light which is supplied by control elements 72 and passed through switching layer 184. The switching efficiency is thereby improved.

A portion of switching layer 184 extends laterally beyond third conductor 182 in the specific example of FIGS. 13–15. Protective layer 186 lies on this portion of switching layer 184 and consists of opaque electrically insulating material so as to prevent ambient light from striking layer 184. Alternatively, protective layer 186 can be located on the interior surface of faceplate 172. Layer 186 may then consist of opaque insulating or electrically non-insulating material.

As another variation, third conductor 182 can lie fully on the interior surface of backplate 170. In this case, switching layer 184 lies on conductor 182 and extends over the ends of conductor 182 closest to shutter component 78. First conductors 176 then extend from backplate 170 over the top of switching layer 184.

A portion of switching layer 184 typically extends laterally beyond the control-side ends of first conductors 176 in the variations where conductors 176 overlie first conductor 182 opposite control elements 72. Protective layer 186, here consisting of opaque electrically insulating material, lies on this portion of switching layer 184. Alternatively, protective layer 185 can consist of opaque electrically insulating or electrically non-insulating material located on the interior surface of faceplate 172. In all of these variations, layer 186 prevents ambient light from striking protective layer 184.

Rather than having a portion of switching layer 184 extend laterally beyond third conductor 182 in the specific example of FIGS. 13–15, layer 184 can undercut conductor 182 along the edge of conductor 182 closest to shutter component 78. Similarly, switching layer 184 can undercut the control-side ends of first conductors 176 in the alternatives described in the previous paragraph. The undercutting can be achieved with appropriate etchant. In both of these variations, substantially none of switching layer 184 is exposed to ambient light. Accordingly, protective layer 186 can be eliminated in these two variations.

As with the implementation of FIGS. 10–12, switching layer 184 is allocated into switching portions 190 in the implementation of FIGS. 13–15 and in the above-described variations of this implementation. Switching portions 190 are illustrated in dashed lines in FIGS. 14 and 15. Provided that third conductor 182 and/or first conductors 176 are suitable patterned in control section 76, switching layer 84 can be appropriately patterned so that switching portions 190 are physically separated from one another. Each first conductor 176 physically adjoins one or more, two in the specific example of FIGS. 13–15, associated switching portions 190. Each shutter control element 82 then basically consists of third conductor 182, one switching portion 190, and the adjacent portion of protective layer 186 to the extent that it is present.

Shutter control elements 82 can be implemented with switches other than switching portions 190 in both the implementation of flat-panel display 50 in FIGS. 10–12 and the implementation of display 50 in FIGS. 13–15. For example, a phototransistor can be substituted for each switching portion 190. Each phototransistor connects third conductor 182 to an associated one of first conductors 176. The phototransistors become electrically conductive when sufficient light of the specified type and of at least the threshold value strikes them. Consequently, the phototransistors operate similarly to switching portions 190. The phototransistors are typically formed with amorphous semiconductor material such as amorphous silicon.

Polarizerless Liquid Crystal

Liquid-crystal material 178 is preferably implemented with liquid crystal capable of being controlled to selectively transmit a general image defined by unpolarized light incident on the liquid crystal. That is, the liquid crystal can selectively transmit an image, such as the display image on interior surface 56, without the use of polarizers. This type of liquid crystal is referred to here as "polarizerless" liquid crystal. The polarizerless liquid crystal is switchable between an "on" condition in which the image is transmitted and an "off" condition in which the image is not transmitted. In the off condition, the polarizerless liquid crystal appears quite dark, preferably black.

The polarizerless liquid crystal which preferably implements liquid-crystal material 178 is typically of the type referred to here as "guest/host" in which a guest black dichroic dye is mixed with a liquid-crystal host. The liquid-crystal host contains relatively long liquid-crystal molecules. The black dichroic dye consists of relatively long dye molecules that generally align to the molecules of the liquid crystal host. That is, the long axis of a dye molecule extends roughly along the long axis of an adjacent liquid-crystal molecule. Guest/host liquid crystal is generally discussed in Bahadur, *Liquid Crystals, Applications and Uses* (World Scientific Pub. Co. Pte. Ltd.), Vol. 3, 1992, pages 65–208, the contents of which are incorporated by reference herein.

The liquid-crystal host preferably consists of cholesteric liquid crystal capable of being switched into a nematic-like state upon application of a suitable electric field. In the cholesteric case, the guest/host liquid crystal is employed in generally the following manner for selectively transmitting an image defined by unpolarized visible light. The guest/host liquid-crystal material is sandwiched between a pair of transparent, suitably patterned, parallel electrically conductive plates.

When there is (substantially) no electric field across the liquid crystal, the molecules of the cholesteric liquid-crystal host extend generally parallel to the conductive plates but with a helix-like twist, referred to here as cholesteric twist, whose axis is approximately perpendicular to the conductive plates. The local direction of alignment of the cholesteric host is referred to here as the director orientation. The director of the cholesteric host thus rotates in going from one of the conductive plates to the other plate. The pitch of the cholesteric twist is the distance in which the director of the host material rotate through 360°. In other words, the pitch is the distance of one complete twist.

The guest black dichroic dye normally consists of a mixture of multiple, typically at least three, color (i.e., non-black) dichroic dyes. Each component of the black dye is termed dichroic because the light-absorption band of each color dye molecule depends on the orientation of the polarization direction, i.e., the electric field vector, of light incident on the color dye molecule relative to the orientation of the long axis of the molecule. Specifically, each color dye molecule typically significantly absorbs incident visible light whose polarization direction is largely parallel to the molecule's long axis and whose wavelength falls within the molecule's absorption band. Other incident visible light is largely not absorbed by the color dye molecule. Dichroic dye having this type of absorption characteristic is termed positive dichroic dye.

The guest black dichroic dye may also consist of dye molecules having individual light-absorption bands that extend largely across the visible light spectrum for incident visible light whose polarization direction is perpendicular to the long axes of the molecules. That is, the black dye may be a single-component dye. Also, each molecule of the black dichroic dye, whether a multi-component or single-component dye, may significantly absorb incident visible light whose polarization direction is at a significant angle, e.g., approximately 90° for negative dichroic dye, to the molecule's long axis and whose wavelength falls within the molecule's light-absorption band, other incident visible light being largely not absorbed by the molecule. When a dichroic dye is described herein as being black or as being of a single (non-black) color, it is implicit that the dye has a transparent appearance condition as well as an appearance condition which is black or of the indicated color.

With the molecules of the guest black dichroic dye aligned generally to the molecules of the host cholesteric liquid crystal and with (substantially) no electric field present across the composite liquid crystal, the black dye undergoes largely the same twist as the cholesteric liquid-crystal host. As unpolarized visible light impinges on one of the conductive plates, the twist enables the black dye to progressively absorb more of the incident light as it attempts to penetrate deeper into the liquid crystal, provided that the pitch of the cholesteric twist is sufficiently small to achieve adequate light absorption. It is normally desirable that the pitch be greater than, but not much greater than, the maximum wavelength of the incident light in the liquid crystal. At a twist of 90° and at a suitably small pitch, the dye would be on the verge of being able to absorb substantially all the unpolarized visible light that impinges perpendicularly on one of the plates.

The ability of the black dichroic dye to absorb visible light also depends on the thickness of the liquid-crystal material and the dye concentration in the liquid-crystal material. Usually, the liquid-crystal thickness is of such a value that the twist is a minimum of 180°, preferably at least 360°. Accordingly, unpolarized visible light incident on one of the conductive plates encounters dye molecules whose long axes are aligned with largely every polarization direction. The dye thus absorbs visible light incident at all polarization directions. The dye concentration is normally 0.1–10 wt %, preferably 0.5–5 wt %, more preferably 1–3 wt %. The result is that the black dichroic dye absorbs a high fraction of the incident unpolarized visible light. Accordingly, the dye causes the cholesteric-based guest/host liquid crystal to appear largely black. An image defined by the incident unpolarized visible light is largely not transmitted through the guest/host liquid crystal. The liquid crystal is in the off condition.

The cholesteric-based guest/host liquid crystal is placed in the on condition by substantially eliminating (undoing) the twist. This is accomplished by using the conductive plates to impress a sufficiently high electric field across the liquid-crystal material that the long axes of the cholesteric host molecules become aligned in the direction of the external electric field and therefore approximately perpendicular to either plate. Since the black dye molecules are generally aligned with the cholesteric molecules, the long axes of the dye molecules extend generally perpendicular to either plate. In this orientation, the dye molecules transmit a high fraction of unpolarized visible light incident on either plate. By switching the electric field between the twisted off condition and the untwisted on condition, the cholesteric-based guest/host liquid crystal selectively transmits an image defined by unpolarized visible light.

With the foregoing in mind, the portion of the cholesteric-based guest/host liquid crystal in each shutter strip 80 has a suitably small pitch and a cholesteric twist, normally at least 180°, preferably at least 360°, when that strip 80 is in its light-absorptive state. The absorptive state for each strip 80 arises when conductors 176 and 180 impose no significant voltage, and thus no significant electric field, across the liquid-crystal portion in that strip 80. Each strip 80 is switched to its light-transmissive state by causing conductors 176 and 180 to impose a suitable high voltage across the liquid-crystal portion in that strip 80 so that the resultant electric field across the liquid-crystal portion causes the twist to be substantially eliminated. This voltage is typically 20–50 volts for a typical switching time of 1–2 msec.

Candidates for the cholesteric-based guest/host liquid crystal include MLC-6027 000, ZLI-5035/3, and ZLI-4756 mixtures combined with BDH 1297 highly twisting cholesteric (chiral) dopant. All of these materials are commercially available from Merck Darmstadt. The MLC-6027 000, ZLI-5035/3, and ZLI-4756 mixtures contain black dichroic dye respectively combined with MLC-6023-100, ZLI 3295-000, and ZLI 3700-000 nematic liquid-crystal materials. The percentage of black dichroic dye in each of the resulting three candidates for the cholesteric-based guest/host liquid crystal is 1–3 wt %.

The pitch of the cholesteric twist is normally chosen to be no more than 5 μm in order to have adequate light absorption and suitably fast switching speed. The pitch is preferably no more than 3 μm, more preferably 1–2 μm. The highly twisting dopant, e.g., BDH 1297 cholesteric dopant in the three guest/host candidates described above, enables the composite liquid-crystal material to achieve a low pitch value, typically down to 1 μm.

The cholesteric-based guest/host material normally has a thickness of 2–10 μm, preferably 3–6 μm. In a typical implementation, the liquid-crystal thickness at a 1-μm pitch is approximately 5 μm, leading to a total cholesteric twist of approximately 1800°. The percentage of BDH 1297 dopant in this implementation is approximately 1.5 wt %. Approximately 0.75 wt % BDH 1297 dopant is used to achieve a pitch of 2 μm.

The liquid-crystal host material in the guest/host case may alternatively consist of encapsulated polymer-dispersed liquid crystal in which an emulsion of water-based polymer is combined with liquid crystal. The water-based polymer does not significantly dissolve molecules of the guest black dichroic dye. Consequently, the black dye is directly associated with the liquid crystal in the host material. In particular, the long dye molecules generally align to the long liquid-crystal molecules.

In the off condition, the liquid-crystal molecules in the encapsulated polymer-dispersed liquid crystal are situated at random orientations relative to one another. Due to the random orientations of the liquid-crystal molecules, the molecules of the black dichroic dye are also situated at random orientations relative to one another. As a consequence, the black dichroic dye absorbs light incident on the dye molecules. Hence, the combination of the encapsulated polymer-dispersed liquid crystal and the black dichroic dye appears black in the off condition. No image is transmitted through the composite liquid crystal.

To place the encapsulated polymer-dispersed liquid-crystal/black dye combination in the on condition, a suitable electric field is applied across the composite liquid-crystal material. The liquid-crystal molecules align to the electric field such that the black dye molecules similarly align to the electric field. A large fraction of incident unpolarized light now passes through the liquid crystal. By utilizing conductors 176 and 180 to selectively apply an electric field that causes the encapsulated polymer-dispersed liquid-crystal/black dye combination to switch between the randomly oriented off condition and the aligned on condition, an image defined by incident unpolarized visible light is selectively transmitted through the liquid crystal.

A pleochroic dye has two or more appearance conditions. The above-mentioned black dichroic dye, which has selectively presentable black and transparent appearance conditions, is one type of pleochroic dye. In general, a pleochroic dye having more than two selectively presentable appearance conditions can be substituted for the black dichroic dye employed in the guest/host liquid crystals provided that the pleochroic dye has selectively presentable black and transparent appearance conditions and provided that each other appearance condition does not significantly occur during the operation of flat-panel display 50.

It may, in some cases, be acceptable or desirable for shutter strips 80 to be dark, but not largely black, when they are in their light-absorptive states. For example, dark blue or dark brown may sometimes be acceptable appearances for strips 80 in their absorptive states. In such cases, a pleochroic dye having selectively presentable dark, e.g., dark blue or dark brown, and largely transparent appearance conditions can be substituted for the pleochroic or black dichroic dye described above. The replacement pleochroic dye is typically a dark dichroic dye of the acceptable or desirable color.

Liquid-Crystal Light Shutter Control

Second conductor 180 is, during display operation supplied with a base voltage signal $V_B$ through a suitable connection (not shown). During display operation, third conductor 182 receives a control voltage signal $V_C$ through a suitable connection (likewise not shown). As discussed further below, control voltage $V_C$ is selectably applied to each of first conductors 176. The relationship between voltages $V_B$ and $V_C$ is normally of such a nature that the portion of liquid-crystal material 178 situated between each first conductor 176 and the oppositely located portion of second conductor 180 goes into the on condition, i.e., the transparent appearance condition, when control voltage $V_C$ is applied to that first conductor 176. For this purpose, voltages $V_B$ and $V_C$ typically differ by an approximately fixed amount whenever control voltage $V_C$ is being applied to one of first conductors 176.

It is normally desirable that the average DC current passing through liquid-crystal material 178 be approximately zero. This can be achieved by switching control voltage $V_C$ at suitable intervals between a pair of values that are approximately equal amounts above and below base voltage VB. For example, the $V_C$ switching can be done once during each frame of the image. Alternatively, base voltage $V_B$ can be switched in an analogous manner to achieve approximately zero DC current through liquid crystal 178.

Each of first conductors 176 is connected to a mechanism (not shown) which enables that conductor 176 to be at control voltage $V_C$ when voltage $V_C$ is applied to one end of conductor 176 and which enables conductor 176 to rapidly go to base voltage $V_B$ when conductor 176 ceases to receive control voltage $V_C$. Each first conductor 176 can, for example, be connected to one end of a relatively high-value resistor, typically in the vicinity of 1 megaohm, whose other end is connected to a source of base voltage $V_B$. When control voltage $V_C$ is applied to one end of a conductor 176, a voltage drop occurs across the resistor so as to enable conductor 176 to be at voltage $V_C$. When voltage $V_C$ ceases to be applied to conductor 176, the voltage drop across the resistor goes to zero relatively rapidly, thereby causing conductor 176 to reach voltage $V_B$.

Alternatively, liquid-crystal material 178 can be implemented with liquid crystal whose current leakage is relatively high. When control voltage $V_C$ ceases to be applied to a portion of such leaky liquid crystal situated between a first conductor 176 and the oppositely located portion of second conductor 180, the high current leakage through the liquid-crystal portion rapidly causes that conductor 176 to reach base voltage $V_B$ on second conductor 180. As another alternative, a light-sensitive switching mechanism similar to that provided by control component 62/76 but operating in a complementary manner to component 62/76 can be utilized to place each first conductor 176 at base voltage $V_B$ when that conductor's shutter strip 80 is to enter the light-absorptive state.

With the foregoing in mind, flat-panel display 50 in FIGS. 10–12 or FIGS. 13–15 operates in the following manner. When a selection signal 90 (see FIG. 6 or 9) for an imaging line goes to that signal's selection condition, electron-emissive imaging regions 152 in that line's imaging element 68 selectively emit electrons which cause light-emissive imaging elements 162 in that line's elements 68 to selectively emit light which produces a line of the image on interior surface 56. Similarly, when a selected shutter strip 80, currently in its light-absorptive state, needs to be in its light-transmissive state, first control signal 114 for an associated control element 72 goes to that signal's selection condition. Electron-emissive control region 154 in that control element 72 emits electrons which cause light-emissive control element 164 in that element 72 to emit light of the specified type and of the threshold value.

The light emitted by light-emissive control element 164 in the preceding control element 72 strikes the oppositely situated switching portion 190 of switching layer 184 and causes that portion 190 to switch from its insulating condition to its conductive condition. Control voltage $V_C$ is thereby applied from third conductor 182 through that switching portion 190 to first conductor 176 for that portion 190. This causes the portion of liquid-crystal material 178 situated between that first conductor 190 and the oppositely located portion of second conductor 180 to switch from its off condition, i.e., its black appearance condition, to its on condition, i.e., its transparent appearance condition. Shutter strip 80 formed with that first conductor 176, the oppositely located portion of second conductor 180, and the intervening portion of liquid crystal 178 then switches from its absorptive state to its transmissive state.

Any other control element 72 associated with the preceding shutter strip 80 causes the oppositely located switching portion 190 to become conductive and provide control voltage $V_C$ to first conductor 178 for that strip 80. This action merely reinforces the transmissive state for that strip 80 since it is already in its transmissive state. The reverse occurs when every control element 72 for that strip 80 ceases to provide the requisite light. Each switching portion 190 for first conductor 176 in strip 80 returns to its insulating condition. Strip 80 switches back to its absorptive state. Consequently, shutter control elements 82 formed by third conductor 182, switching portions 190, and protective layer 186 form light-activated switches for controlling strips 80.

Various techniques can be utilized to improve or optimize the performance of flat-panel display 50 in FIGS. 10–12 or in FIGS. 13–15. The characteristics of liquid-crystal material 178 can be tailored so that it turns on rapidly but turns off slowly. Rapid liquid-crystal turn-on generally increases the contrast ratio. Rapid liquid-crystal turn-on can be combined with an increased number of shutter strips 80 to further improve the contrast ratio. The slow liquid-crystal turn-off can, in some embodiments, be employed by itself to cause each shutter strip 80 to be its transmissive state long enough to allow for image persistence. In other embodiments, the slow turn-off can be utilized in combination with the above-described image-persistence capability provided by control circuitry 98 to optimize the light-transmissive time allowed for image persistence.

Flat-Panel Display Fabrication

Flat-panel display 50 in FIGS. 10–12 or FIGS. 13–15 is typically manufactured in the following manner. Backplate structure 130, faceplate structure 132, outer wall 134, electronic circuitry 64, and LCD shutter 54 are separately made. Plate structures 130 and 132 and outer wall 134 are assembled to form FED structure 60/62. Circuitry 64 and shutter 54 are subsequently mounted on structure 60/62.

Variations

Various modifications can be applied to flat-panel display 50 in the implementation of FIGS. 10–12 or FIGS. 13–15. LCD backplate 170 can be eliminated. In that case, all of the components previously provided on backplate 170 are provided directly on FED faceplate 160 along surface 56. The display fabrication procedure is adjusted accordingly.

Second conductor 180 may lie on the interior surface of backplate 170 rather than on the interior surface of faceplate 172. Components 176, 182, and 186 then typically lie on the interior surface of faceplate 172 with conductive layers 176 and 182 partially extending over protective layer 186. In so varying the implementation of FIGS. 10–12, switching layer 184 lies on protective layer 186. Switching layer 184 extends over third conductor 182 and, when present, protective layer 186, in so varying the implementation of FIGS. 13–15.

Liquid-crystal material 178 can be formed with liquid crystal that requires polarizers to form a structure capable of selectively transmitting incident unpolarized light. One polarizer is then inserted between FED faceplate 160 and LCD backplate 170. A second polarizer is placed over the exterior surface of LCD faceplate 172. Depending on how the polarizers are arranged, each shutter strip 80 can be in either its transmissive or absorptive state when a suitable voltage is applied across the associated portion of liquid crystal 178, and vice-versa when no significant voltage is present across that portion of liquid crystal 178.

FED structure 60/62 can be replaced with a structure that utilizes electron-emissive elements which emit electrons according to thermionic emission rather than field emission. In the thermionic emission case, the electron-emission elements typically emit electrons continuously. Control electrodes responsive to control data signals 106 and second control signal 118 selectively collect certain of the emitted electrons, thereby letting other selected electrons strike oppositely situated light-emissive elements respectively in imaging elements 68 and control elements 72.

Activation delays can be incorporated into row drivers 94 in FIG. 6. With shutter control circuitry 98 operating directly in response to line selection signals 90, the row driver delays can be set at suitable magnitudes for causing each shutter strip 80 to be placed in its transmissive state shortly before the first associated imaging line is activated.

Flat-panel display 50 in FIGS. 10–12 or FIGS. 13–15, including the foregoing modifications to light shutter 54, can generally be utilized with any of the non-CRT implementations described above for image-producing component 60 and control section 62 with possibly one notable exception. When structure 60/62 is implemented as a reflective LCD which reflects light that passes through the viewing portion of exterior surface 58, the light provided by control elements 72 for controlling shutter control elements 82 needs to originate from a light source not located directly in front of switching layer 184. This requirement can be met by utilizing the light-pipe technique described above to provide elements 72 with light or by providing ambient light to elements 72 by way of paths that avoid switching layer 184. Implementing control section 62 as a transmissive (rather than reflective) LCD, as mentioned above, also meets this requirement.

The light-controlled switching technique implemented by control component 62/76 can be utilized in displays other than flat-panel displays. In general, this light-controlled switching technique can be employed in any display where the imaging elements are activated as individual lines, typically one line at a time, or as individual imaging elements. As one example, the light-controlled switching mechanism of component 62/76 can be employed in a raster-scanned display, including one of the deflected-beam type. As another example, this light-controlled switching mechanism can be employed to enhance the contrast of a laser-written display in when light provided by a laser generates individual lines of an image. The laser-written display may use raster scanning.

Further applications for the light-controlled switching mechanism of control component 62 include front and rear projection screens which utilize line-at-a-time activation. In a front projection screen, an image formed with individual imaging lines is projected on the screen from the front of the screen. The opposite occurs in a rear projection screen. In either case, a shutter control section and a shutter component respectively corresponding to shutter control section 76 and shutter component 78 containing shutter strips 80 are positioned over the front of the screen.

While the invention has been described with reference to particular embodiments, this description is solely for the purpose of illustration and is not to be construed as limiting the scope of the invention claimed below. For example, field emission includes the phenomena generally termed surface conduction emission. The designations of "rows" and "columns" are arbitrary and can be reversed. In such a reversal, an imaging line consists of a column of imaging elements such as elements 68. The imaging elements in an imaging line can abut or overlap rather than being laterally separated.

The switching of shutter strips 80 in light shutter 54 may be controlled by a technique other than one utilizing light furnished by image-producing flat-panel device 52. In this variation, strips 80 typically continue to switch in (indirect) response to line selection signals 90 or/and selection generation signal 122 so that shutter 54 is synchronized to device 52. Strips 80 may be implemented with strips, other than liquid-crystal strips, which can be switched between black and transparent appearance conditions. Various modifications and applications may thus be made by those skilled in the art without departing from the true scope and spirit of the invention as defined in the appended claims.

What is claimed is:

1. A display comprising:
an image-producing flat-panel component having a multiplicity of imaging lines for producing an image, each imaging line being regularly updated to provide light that produces part of the image; and
a set of shutter strips, each (a) associated with at least one of the imaging lines, (b) situated in front of each so-associated imaging line outside the image-producing component, and (c) being switched during operation of the display between a light-transmissive state and a light-absorptive state such that each shutter strip is in its light-transmissive state at least partly while each imaging line associated with that strip is providing light for creating the image, the shutter strips constituting parts of a liquid-crystal structure in which liquid-crystal material comprises host cholesteric liquid crystal and guest black dichroic dye, part of the liquid-crystal material being present in each shutter strip and, when that shutter strip is in its light-absorptive state, having a cholesteric twist whose twist pitch is no more than 5 μm.

2. A display as in claim 1 wherein each shutter strip (a) transmits at least a portion $P_{T-TS}$ of incident visible light provided from each imaging line associated with that strip when it is in its light-transmissive state and (b) absorbs at least a portion $P_{A-AS}$ of incident visible light provided from outside the display when that strip is in its light-absorptive state, $P_{T-TS}+P_{A-AS}$ being greater than 1.

3. A display as in claim 2 wherein each shutter strip transmits up to a portion $P_{T-AS}$ of incident visible light provided from outside the display, $P_{T-TS}-P_{T-AS}$ being at least 0.1.

4. A display as in claim 1 wherein each shutter strip outwardly appears dark when it is in its light-absorptive state.

5. A display as in claim 1 wherein:
each imaging line is selectively activated to provide light which produces that imaging line's part of the image; and
each shutter strip is in its light-transmissive state at least largely while each imaging line associated with that strip is activated.

6. A display as in claim 5 wherein, during operation of the display, each shutter strip is also in its light-transmissive state largely when each activated imaging line associated with that strip is essentially fully black.

7. A display as in claim 5 wherein, during operation of the display, a variably selectable plurality of consecutive ones of the shutter strips are simultaneously in their light-transmissive states when at least one other of the shutter strips is in its light-absorptive state.

8. A display as in claim 7 wherein the selectable plurality of shutter strips are simultaneously in their light-transmissive states when a variably selectable one of the imaging lines associated with that plurality of shutter strips is activated and each other imaging line associated with that plurality of shutter strips is deactivated.

9. A display as in claim 5 wherein:
the imaging lines are selectively activated in response to a multiplicity of selection signals; and
the shutter strips switch between their light-transmissive and light-absorptive states largely in response to the selection signals or/and at least one selection generation signal utilized in generating the selection signals.

10. A display as in claim 9 wherein:
each imaging line becomes activated when a different corresponding one of the selection signals goes to a selection condition and becomes deactivated when the corresponding selection signal leaves its selection condition;
no more than part of the selection signals are simultaneously at their selection conditions at any time during normal operation of the display; and
each shutter strip is in its light-transmissive state at least largely while the selection signal for each imaging line associated with that strip is at that selection signal's selection condition.

11. A display as in claim 10 wherein substantially only one of the selection signals is at that selection signal's selection condition at any time during normal operation of the display.

12. A display as in claim 11 wherein each imaging line emits light in response to radiation that impinges selectively on light-emissive material of that imaging line.

13. A display as in claim 12 wherein the light-emissive material comprises phosphor.

14. A display as in claim 10 wherein one of the shutter strips is in its light-transmissive state while the selection signal for each imaging line associated with that shutter strip is not at that selection signal's selection condition.

15. A display as in claim 9 further including a control component for selectively placing the shutter strips in their light-transmissive and light-absorptive states in response to the selection signals or/and each selection generation signal.

16. A display as in claim 15 wherein the control component comprises a group of control elements for selectively providing light that determines placement of the shutter strips in their light-transmissive and light-absorptive states.

17. A display as in claim 16 wherein each control element is operable to provide light that causes an associated one of the shutter strips to be in a specified one of its light-transmissive and light-absorptive states.

18. A display as in claim 16 wherein the light provided by the control elements comprises part of the light provided by the imaging lines.

19. A display as in claim 5 wherein each imaging line comprises a line of laterally separated imaging elements.

20. A display as in claim 19 wherein each imaging element is light emissive.

21. A display as in claim 20 wherein each imaging element emits light in response to radiation that impinges selectively on light-emissive material of that imaging element.

22. A display as in claim 21 wherein the light-emissive material comprises phosphor.

23. A display as in claim 21 wherein the radiation comprises electrons.

24. A display as in claim 20 wherein each imaging element emits light in response to a potential across material of that imaging element.

25. A display as in claim 19 wherein each imaging element comprises a light valve.

26. A display as in claim 25 wherein each light valve includes means for providing light selectively transmitted by that light valve.

27. A display as in claim 1 wherein:
the imaging lines are regularly updated in response to a multiplicity of selection signals; and
the shutter strips switch between their light-transmissive and light-absorptive states largely in response to the selection signals or/and at least one selection generation signal utilized in generating the selection signals.

28. A display as in claim 27 wherein each imaging line continues to produce its updated part of the image largely until that imaging line's part of the image is updated again.

29. A display as in claim 1 wherein the image-producing component has first and second plate structures that together generate the image, the plate structures being spaced apart from, and extending generally parallel to, each other in an active display region.

30. A display as in claim 29 wherein the plate structures are generally flat.

31. A display as in claim 29 wherein the image-producing component comprises a generally flat cathode-ray tube display in which the first and second plate structures respectively comprise an electron-emitting device and a light-emitting device.

32. A display as in claim 31 wherein:
each imaging line comprises a line of laterally separated light-emissive imaging elements of the light-emitting device; and
the electron-emitting device emits electrons that selectively strike the light-emissive imaging elements and cause them to emit light that produces the image.

33. A display as in claim 1 wherein the image-producing component comprises one of:
a generally flat cathode-ray tube display;
a generally flat liquid-crystal display;
a generally flat plasma display;
a generally flat electroluminescent display;
a generally flat light-emitting diode display; and, aside from the preceding displays,
a further generally flat display in which the imaging lines comprise phosphor which selectively emits light to produce the image.

34. A display as in claim 33 wherein the image-producing component employs line-at-at-time activation for updating the imaging lines.

35. A display as in claim 33 wherein the light-emitting diode display is of organic type.

36. A display as in claim 33 wherein the further display in the image-producing component comprises:
a liquid-crystal device; and
a phosphor-based light-emitting device which selectively emits light when excited by light provided by the liquid-crystal device.

37. A display as in claim 33 wherein the further display in the image-producing component comprises:
a light-providing portion;
an electron-emitting portion which emits electrons upon being excited by light furnished by the light-providing portion; and
a phosphor-based light-emitting device which selectively emits light when struck by electrons emitted by the electron-emitting portion.

38. A display as in claim 37 wherein the light-providing portion comprises an electroluminescent device.

39. A display as in claim 1 wherein the imaging lines extend largely parallel to one another, whereby the shutter strips extend largely parallel to one another.

40. A display as in claim 1 wherein the liquid-crystal material is capable of being controlled to selectively transmit an image defined by unpolarized light incident on the liquid-crystal material.

41. A display as in claim 1 where the guest black dichroic dye comprises long molecules which roughly align with long molecules of the host cholesteric liquid crystal.

42. A display as in claim 1 wherein the cholesteric twist of each shutter strip in its light-absorptive state is at least 180°.

43. A display as in claim 42 wherein the cholesteric twist of each shutter strip in its light-absorptive state is at least 360°.

44. A display as in claim 1 wherein the twist pitch of each shutter strip in its light-absorptive state is no more than 3 µm.

45. A display as in claim 1 wherein the liquid-crystal material is no more than 10 µm in thickness.

46. A display as in claim 1 wherein the black dichroic dye has a concentration of 0.1–10 wt % in the host cholesteric liquid crystal.

47. A display as in claim 46 wherein the concentration of the black dichroic dye is 0.5–5 wt %.

48. A display as in claim 1 wherein each shutter strip in the liquid-crystal structure includes:
a different corresponding one of a set of laterally separated first electrical conductors; and
a portion, situated opposite the corresponding first conductor, of a second electrical conductor spaced apart from the first conductor, part of the liquid-crystal material being situated between the corresponding first conductor and the portion of the second conductor.

49. A display as in claim 1 wherein the display has an aspect ratio of average lateral dimension to maximum thickness of at least 4.

50. A display as in claim 1 wherein the image-producing component is matrix addressed.

51. A display as in claim 1 wherein largely all of the image part produced by the light provided by each imaging line is displayed largely simultaneously.

52. A display comprising:
an image-producing component having a multiplicity of imaging lines for producing an image, each imaging line being regularly updated to provide light that produces part of the image, largely all of each such image part being displayed largely simultaneously at any time when that image part is being displayed; and
a set of shutter strips, each (a) associated with at least one of the imaging lines, (b) situated in front of each so-associated imaging line outside the image-producing component, and (c) being switched during operation of the display between a light-transmissive state and a light-absorptive state such that each shutter strip is in its light-transmissive state at least partly while each imaging line associated with that strip is providing light for creating the image, the shutter strips constituting parts of a liquid-crystal structure in which liquid-crystal material comprises host cholesteric liquid crystal and guest black dichroic dye, part of the liquid-crystal material being present in each shutter strip and, when that shutter strip is in its light-absorptive state, having a cholesteric twist whose twist pitch is no more than 5 μm.

53. A display as in claim 52 wherein each shutter strip (a) transmits at least a portion $P_{T\text{-}TS}$ of incident visible light provided from each imaging line associated with that strip when it is in its light-transmissive state and (b) absorbs at least a portion $P_{A\text{-}AS}$ of incident visible light provided from outside the display when that strip is in its light-absorptive state, $P_{T\text{-}TS}+P_{A\text{-}AS}$ being greater than 1.

54. A display as in claim 52 wherein:
the imaging lines are regularly updated in response to a multiplicity of selection signals; and
the shutter strips switch between their light-transmissive and light-absorptive states largely in response to the selection signals or/and at least one selection generation signal utilized in generating the selection signals.

55. A display as in claim 52 wherein the twist pitch of each shutter strip in its light-absorptive state is no more than 3 μm.

56. A display as in claim 52 wherein the liquid-crystal material is no more than 10 μm in thickness.

57. A display as in claim 52 wherein the cholesteric twist of each shutter strip in its light-absorptive state is at least 360°.

58. A method comprising the following steps for manufacturing a flat-panel display:
forming an image-producing flat-panel component having a multiplicity of imaging lines for producing an image such that each imaging line is regularly updatable to provide light that produces part of the image;
forming a shutter comprising a set of shutter strips that constitute parts of a liquid-crystal structure in which liquid-crystal material comprises host cholesteric liquid crystal and guest black dichroic dye; and
placing the shutter over the image-producing component so that each shutter strip is (a) associated with at least one of the imaging lines, (b) situated in front of each so-associated imaging line outside the image-producing component, and (c) switchable during display operation between a light-transmissive state and a light-absorptive state such that each shutter strip is in its light-transmissive state at least partly while each imaging line associated with that strip is providing light for creating the image, part of the liquid-crystal material being present in each shutter strip and, when that shutter strip is in its light-absorptive state, having a cholesteric twist whose twist pitch is no more than 5 μm.

59. A method as in claim 58 wherein the first-mentioned forming step comprises assembling first and second plate structures together through an outer wall to form the image-producing component.

60. A method as in claim 58 wherein the twist pitch of each shutter strip in its light-absorptive state is no more than 3 μm.

61. A method as in claim 58 wherein all of the image part produced by the light provided by each imaging line is displayed largely simultaneously at any time when that image part is being displayed.

62. A method comprising the steps of:
producing an image by regularly updating each of a multiplicity of imaging lines of an image-producing flat-panel component to provide light that produces part of the image; and
switching each of a set of shutter strips, each associated with at least one of the imaging lines and being situated in front of each so-associated imaging line outside the image-producing component, between a light-transmissive state and a light-absorptive state such that each shutter strip is in its light-transmissive state at least partly while each imaging line associated with that strip is providing light for creating the image, the shutter strips constituting parts of a liquid-crystal structure in which liquid-crystal material comprises host cholesteric liquid crystal and guest black dichroic dye, part of the liquid-crystal material being present in each shutter strip and, when that shutter strip is in its light-absorptive state, having a cholesteric twist whose twist pitch is no more than 5 μm.

63. A method as in claim 62 wherein:
the producing step involves regularly updating the imaging lines in response to a multiplicity of selection signals; and
the switching step involves switching the shutter strips between their light-transmissive and light-absorptive states largely in response to the selection signals or/and at least one selection generation signal utilized in generating the selection signals.

64. A method as in claim 62 wherein the twist pitch of each shutter strip in its light-absorptive state is no more than 3 μm.

65. A method as in claim 62 wherein all of the image part produced by the light provided by each imaging line is displayed largely simultaneously at any time when that image part is being displayed.

* * * * *